US011051275B2

(12) United States Patent
Loehr et al.

(10) Patent No.: US 11,051,275 B2
(45) Date of Patent: Jun. 29, 2021

(54) SEMI-PERSISTENT RESOURCE ALLOCATION BEHAVIOR FOR V2X TRANSMISSIONS

(71) Applicant: Panasonic Intellectual Property Corporation of America, Torrance (CA)

(72) Inventors: Joachim Loehr, Hessen (DE); Prateek Basu Mallick, Hessen (DE); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 58 days.

(21) Appl. No.: 16/315,495

(22) PCT Filed: Jul. 7, 2016

(86) PCT No.: PCT/CN2016/089086
§ 371 (c)(1),
(2) Date: Jan. 4, 2019

(87) PCT Pub. No.: WO2018/006313
PCT Pub. Date: Jan. 11, 2018

(65) Prior Publication Data
US 2019/0313375 A1    Oct. 10, 2019

(51) Int. Cl.
*H04W 72/04*    (2009.01)
*H04W 72/10*    (2009.01)

(52) U.S. Cl.
CPC ........... *H04W 72/04* (2013.01); *H04W 72/10* (2013.01)

(58) Field of Classification Search
CPC .............................. H04W 72/04; H04W 72/10
See application file for complete search history.

(56) References Cited

U.S. PATENT DOCUMENTS

| 6,067,298 | A | * | 5/2000 | Shinohara | ............... | H04L 12/28 |
| 2002/0172157 | A1 | * | 11/2002 | Rhodes | ..................... | H04J 1/16 |

(Continued)

FOREIGN PATENT DOCUMENTS

| CN | 101350763 A | 1/2009 |
| KR | 10-2009-0012543 A | 2/2009 |

(Continued)

OTHER PUBLICATIONS

Ericsson, "Discussion on V2X PC5 Scheduling, Resource Pools and Resource Patterns," R1-165276, Agenda Item: 6.2.2.2.2, 3GPP TSG RAN WG1 Meeting #84bis, Busan South Korea, Apr. 11-15, 2016, 8 pages.

(Continued)

*Primary Examiner* — Ronald B Abelson
(74) *Attorney, Agent, or Firm* — Seed IP Law Group LLP

(57) ABSTRACT

The disclosure relates to a transmitting device for transmitting periodic data via a sidelink interface to one or more receiving devices. The transmitting device autonomously selects radio resources for transmitting periodic and aperiodic data via the sidelink interface. A transmitter transmits first periodic data together with first scheduling information to the one or more receiving devices. The first scheduling information indicates radio resources used for transmitting the first periodic data and further indicates reserved radio resources usable at a later point in time by the transmitting device to transmit second periodic data. A processor delays the second periodic data until the later point in time. The transmitter transmits the second periodic data at the later point in time using the reserved radio resources indicated by the first scheduling information. On the other hand, the transmitter transmits other data than the first periodic data at the earliest possible point in time upon becoming available for transmission.

20 Claims, 7 Drawing Sheets

(56) References Cited

U.S. PATENT DOCUMENTS

| | | | |
|---|---|---|---|
| 2006/0209771 A1* | 9/2006 | Shpak | H04Q 7/24 |
| 2009/0240811 A1 | 9/2009 | Wei et al. | |
| 2010/0110886 A1* | 5/2010 | Sorri | H04L 12/24 |
| 2016/0081108 A1 | 3/2016 | Tseng | |
| 2017/0013655 A1* | 1/2017 | Martin | H04W 76/023 |
| 2017/0280173 A1* | 9/2017 | Kure | H04N 21/2385 |

FOREIGN PATENT DOCUMENTS

| | | |
|---|---|---|
| KR | 10-2012-0139001 A | 12/2012 |
| WO | 2015/113719 A1 | 8/2015 |
| WO | 2015/128134 A1 | 9/2015 |
| WO | 2015/142425 A1 | 9/2015 |

OTHER PUBLICATIONS

Japanese Office Action, dated Jan. 7, 2020, for Japanese Application No. 2018-566234, 7 pages. (With English translation).

LG Electronics Inc., "SL SPS enhancement for V2V," R2-162927, Agenda item: 8.2.1, 3GPP TSG-RAN2 Meeting #93bis, Dubrovnik, Croatia, Apr. 11-15, 2016, 5 pages.

Panasonic, "Discussion on resource allocation mechanism in V2X," R1-156963, Agenda Item: 6.2.8.1.1, 3GPP TSG RAN WG1 Meeting #83, Anaheim, USA, Nov. 15-22, 2015, 3 pages.

Panasonic, "Radio resource selection behavior for autonomous resource allocation mode," R2-166643, Agenda Item: 8.2.2, 3GPP TSG RAN WG2 Meeting #95bis, Kaohsiung, Taiwan, Oct. 10-14, 2016, 3 pages.

Panasonic, "Radio resource selection behavior for sensing and semi-persistent transmissions," R2-164849, Agenda Item: 8.2.4, 3GPP TSG RAN WG2 Meeting #95, Gothenburg, Sweden, Aug. 22-26, 2016, 3 pages.

Samsung, "Semi-persistent transmission support for SL," R1-162677, Agenda Item 7.3.2.2.2, 3GPP TSG RAN WG1 Meeting #84bis, Busan Korea, Apr. 11-15, 2016, 6 pages.

3GPP TR 21.905 V13.0.0, "3rd Generation Partnership Project; Technical Specification Group Services and System Aspects; Vocabulary for 3GPP Specifications (Release 13)," Dec. 2015, 64 pages.

3GPP TR 23.713 V13.0.0, "3rd Generation Partnership Project; Technical Specification Group Services and System Aspects; Study on extended architecture support for proximity-based services (Release 13)," Sep. 2015, 80 pages.

3GPP TR 36.843 V12.0.1, "3rd Generation Partnership Project; Technical Specification Group Radio Access Network; Study on LTE Device to Device Proximity Services; Radio Aspects (Release 12)," Mar. 2014, 50 pages.

3GPP TS 23.203 V14.0.0, "3rd Generation Partnership Project; Technical Specification Group Services and System Aspects; Policy and charging control architecture (Release 14)," Jun. 2016, 245 pages.

3GPP TS 23.303 V13.2.0, "3rd Generation Partnership Project; Technical Specification Group Services and System Aspects; Proximity-based services (ProSe); Stage 2 (Release 13)," Dec. 2015, 122 pages.

3GPP TS 23.401 V14.0.0, "3rd Generation Partnership Project; Technical Specification Group Services and System Aspects; General Packet Radio Service (GPRS) enhancements for Evolved Universal Terrestrial Radio Access Network (E-UTRAN) access (Release 14)," Jun. 2016, 374 pages.

3GPP TS 36.211 V13.1.0, "3rd Generation Partnership Project; Technical Specification Group Radio Access Network; Evolved Universal Terrestrial Radio Access (E-UTRA); Physical channels and modulation (Release 13)," Mar. 2016, 155 pages.

3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)," Mar. 2016, 129 pages.

3GPP TS 36.213 V13.1.1, "3rd Generation Partnership Project; Technical Specification Group Radio Access Network; Evolved Universal Terrestrial Radio Access (E-UTRA); Physical layer procedures (Release 13)," Mar. 2016, 361 pages.

3GPP TS 36.300 V13.3.0, "3rd Generation Partnership Project; Technical Specification Group Radio Access Network; Evolved Universal Terrestrial Radio Access (E-UTRA) and Evolved Universal Terrestrial Radio access Network (E-UTRAN); Overall description; Stage 2 (Release 13)," Mar. 2016, 295 pages.

3GPP TS 36.321 V13.1.0, "3rd Generation Partnership Project; Technical Specification Group Radio Access Network; Evolved Universal Terrestrial Radio Access (E-UTRA); Medium Access Control (MAC) protocol specification (Release 13)," Mar. 2016, 85 pages.

ETSI TS 136 321 V13.1.0, "LTE; Evolved Universal Terrestrial Radio Access (E-UTRA); Medium Access Control (MAC) protocol specification (3GPP TS 36.321 version 13.1.0 Release 13)" Apr. 2016, 87 pages.

ETSI EN 302 637-2 V1.3.1, "Intelligent Transport Systems (ITS); Vehicular Communications; Basic Set of Applications; Part 2: Specification of Cooperative Awareness Basic Service," Sep. 2014, 44 pages.

ETSI EN 302 637-3 V1.2.1, "Intelligent Transport Systems (ITS); Vehicular Communications; Basic Set of Applications; Part 3: Specifications of Decentralized Environmental Notification Basic Service," Sep. 2014, 73 pages.

International Search Report, dated Jan. 26, 2017, for International Application No. PCT/CN2016/089086, 3 pages.

Chinese Office Action, dated Mar. 16, 2020, for Chinese Application No. 201680087487.9, 15 pages. (with English machine translation).

Ericsson, "Other Uu Enhancements for V2X," R2-162816, Agenda Item 8.11.1, 3GPP TSG-RAN WG2 #93-bis, Dubrovnik, Croatia, Apr. 11-15, 2016, 4 pages.

Qualcomm Incorporated, "RAN2 aspects of V2V," R2-162731, Agenda item: 8.2.1, 3GPP TSG-RAN WG2 Meeting #93Bis, Dubrovnik, Croatia, Apr. 11-15, 2016, 4 pages.

\* cited by examiner

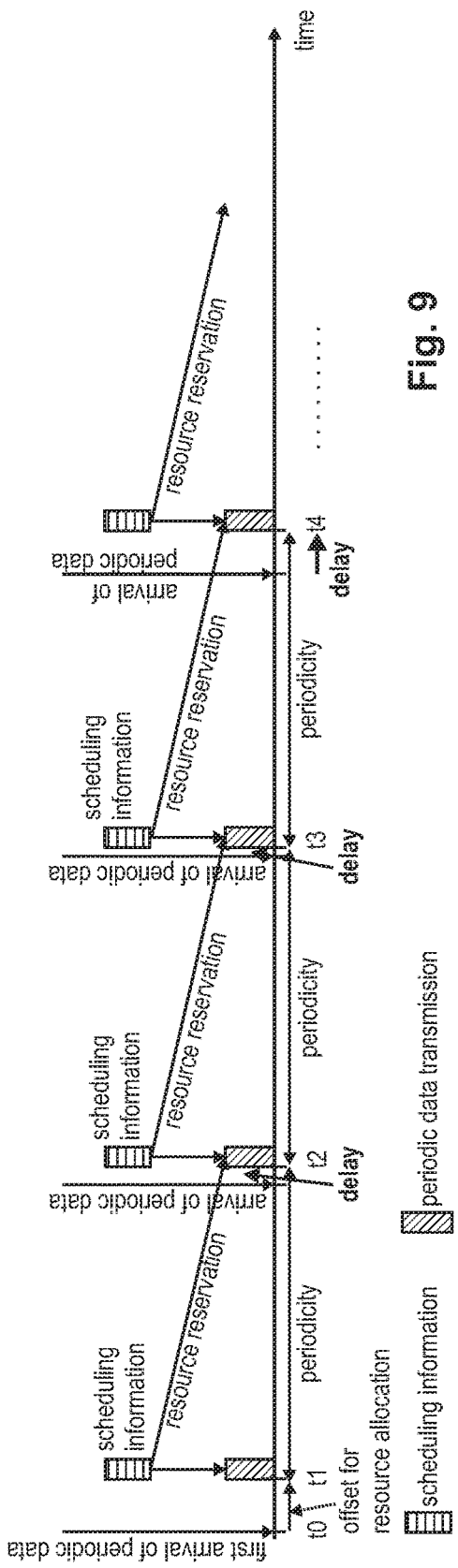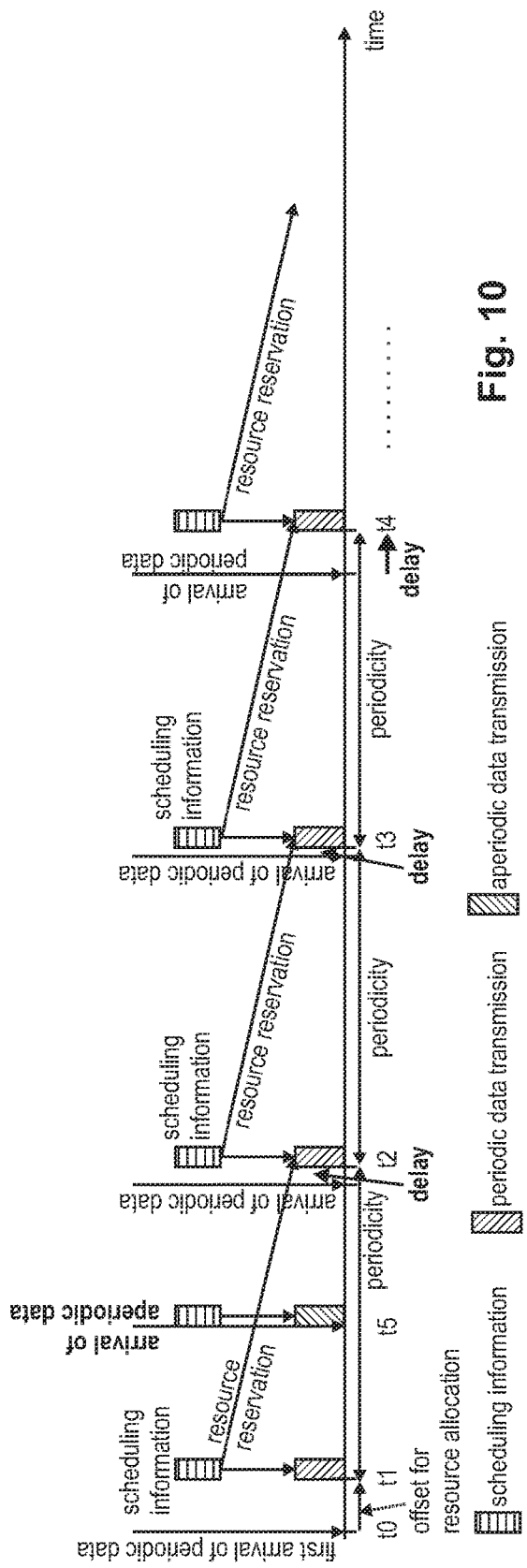

SEMI-PERSISTENT RESOURCE ALLOCATION BEHAVIOR FOR V2X TRANSMISSIONS

BACKGROUND

Technical Field

The present disclosure relates to improved transmission of periodic and aperiodic data from a transmitting device to one or more receiving devices via a sidelink interface using UE-autonomous resource allocation. The present disclosure is providing the corresponding (vehicular) mobile terminal.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6 interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{SC}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{SC}^{RB}$ is the number of subcarriers within one resource block. For normal cyclic prefix subframe structure, $N_{SC}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 13.1.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by, e.g., the 3GPP technical standard TS 36.321, current version 13.1.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e., the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e., the modulation and coding scheme, MCS), the number of physical resource blocks, etc. More information on the functioning of the physical layer can be found in the 3GPP technical standard 36.213 current version 13.1.1, incorporated herein by reference.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signalling Radio Bearer (SRBs) and of radio bearers carrying user data (Data Radio Bearers, DRBs).

The radio link control (RLC) sublayer comprises mainly ARQ functionality and supports data segmentation and concatenation, i.e., RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e., RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v13.1.0 available at http://www.3gpp.org and incorporated herein by reference). The 3GPP technical standard TS 36.212, current version 13.1.0, defines in subclause 5.4.3, incorporated herein by reference, control information for the sidelink interface.

Semi-Persistent Scheduling (SPS)

In the downlink and uplink, the scheduling eNodeB dynamically allocates resources to user equipments at each transmission time interval via the L1/L2 control channel(s) (PDCCH) where the user equipments are addressed via their specific C-RNTIs. As already mentioned before, the CRC of a PDCCH is masked with the addressed user equipment's C-RNTI (so-called dynamic PDCCH). Only a user equipment with a matching C-RNTI can decode the PDCCH content correctly, i.e., the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are dynamically scheduled, this kind of operation is referred to as semi-persistent scheduling (SPS), i.e., resources are allocated to the user equipment on a semi-persistent basis (semi-persistent resource allocation). The benefit is that PDCCH resources for initial HARQ transmissions are saved. Semi-persistent scheduling may be used in the PCell in Release 10, but not in an SCell.

One example for a service, which might be scheduled using semi-persistent scheduling, is Voice over IP (VoIP). Every 20 ms a VoIP packet is generated at the codec during a talk-spurt. Therefore, eNodeB could allocate uplink or respectively downlink resources persistently every 20 ms, which could be then used for the transmission of Voice over IP packets. In general, semi-persistent scheduling is beneficial for services with a predictable traffic behavior, i.e., constant bit rate, packet arrival time is periodic.

The user equipment also monitors the PDCCHs in a subframe where it has been allocated resources for an initial transmission persistently. A dynamic (scheduling) grant, i.e., PDCCH with a C-RNTI-masked CRC, can override a semi-persistent resource allocation. In case the user equipment finds its C-RNTI on the L1/L2 control channel(s) in the sub-frames where the user equipment has a semi-persistent resource assigned, this L1/L2 control channel allocation overrides the persistent resource allocation for that transmission time interval, and the user equipment does follow the dynamic grant. When a user equipment does not find a dynamic grant, it will transmit/receive according to the semi-persistent resource allocation.

The configuration of semi-persistent scheduling is done by RRC signaling. For example the periodicity, e.g., PS_PERIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the SPS activation PDCCH every PS_PERIOD. Essentially, the user equipment stores the SPS activation PDCCH content and follows the PDCCH with the signaled periodicity.

In order to distinguish a dynamic PDCCH from a PDCCH which activates semi-persistent scheduling (also referred to as SPS activation PDCCH), a separate identity is introduced. Basically, the CRC of an SPS activation PDCCH is masked with this additional identity which is in the following referred to as SPS C-RNTI. The size of the SPS C-RNTI is also 16 bits, same as the normal C-RNTI. Furthermore, the SPS C-RNTI is also user equipment-specific, i.e., each user equipment configured for semi-persistent scheduling is allocated a unique SPS C-RNTI.

In case a user equipment detects that a semi-persistent resource allocation is activated by a corresponding SPS activation PDCCH, the user equipment will store the PDCCH content (i.e., the semi-persistent resource assignment) and apply it every semi-persistent scheduling interval, i.e., periodicity signaled via RRC. As already mentioned, a dynamic allocation, i.e., signaled on dynamic PDCCH, is only a "one-time allocation". Retransmissions of an SPS allocation are also signaled using the SPS C-RNTI. In order to distinguish the SPS activation from an SPS re-transmission, the NDI (new data indicator) bit is used. An SPS activation is indicated by setting the NDI bit to 0. An SPS PDCCH with the NDI-bit set to 1 indicates a re-transmission for a semi-persistently scheduled initial transmission.

Similar to the activation of semi-persistent scheduling, the eNodeB also can deactivate semi-persistent scheduling, also called SPS resource release. There are several options how a semi-persistent scheduling de-allocation can be signaled. One option would be to use PDCCH signaling with some PDCCH fields set to some predefined values, i.e., SPS PDCCH indicating a zero size resource allocation. Another option would be to use MAC control signaling.

In the following, further information is provided on how the eNB learns whether periodic data is transmitted by a UE and when to possibly setup the SPS configuration.

When a new bearer is established, according to the dedicated bearer activation procedure in TS 23.401, MME signals the Bearer Setup Request (EPS Bearer Identity, EPS Bearer QoS, Session Management Request, S1-TEID) message to the eNodeB. The eNodeB maps the EPS Bearer QoS to the Radio Bearer QoS. It then signals a RRC Connection Reconfiguration (Radio Bearer QoS, Session Management Request, EPS RB Identity) message to the UE.

The EPS bearer QoS profile includes the parameters QCI, ARP, GBR and MBR. Each EPS bearer (GBR and Non-GBR) is associated with the following bearer level QoS parameters:

QoS Class Identifier (QCI);
Allocation and Retention Priority (ARP).

A QCI is a scalar that is used as a reference to access node-specific parameters that control bearer level packet forwarding treatment (e.g., scheduling weights, admission thresholds, queue management thresholds, link layer protocol configuration, etc.), and that have been pre-configured by the operator owning the access node (e.g., eNodeB). A one-to-one mapping of standardized QCI values to standardized characteristics is captured in TS 23.203 as illustrated in the table below which is based on the one in TS 23.203.

As apparent from the table, QCI value 1 corresponds to "Conversational Voice", i.e., Voice over IP (VoIP). When eNB receives "Bearer Setup Request" message with QCI value 1, eNB knows that this bearer is established for VoIP, and an SPS configuration could be applied to allocate periodic resources for the UE to transmit the VoIP data.

Logical Channel Prioritization, LCP, Procedure

For the uplink, the process by which a UE creates a MAC PDU to be transmitted using the allocated radio resources is fully standardized; the LCP procedure is designed to ensure that the UE satisfies the QoS of each configured radio bearer in a way which is optimal and consistent between different UE implementations. Based on the uplink transmission resource grant message signaled on the PDCCH, the UE has to decide on the amount of data for each logical channel to be included in the new MAC PDU and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest priority logical channel is served first in the MAC PDU, followed by data from the next highest priority logical channel, continuing until the MAC PDU space runs out. Although the absolute priority-based method is quite simple in terms of UE implementation, it sometimes leads to starvation of data from low-priority logical channels. Starvation means that the data from the low-priority logical channels cannot be transmitted because the data from high-priority logical channels takes up all the MAC PDU space.

In LTE, a Prioritized Bit Rate (PBR) is defined for each logical channel, in order to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

| QCI | Resource Type | Priority Level | Packet Delay Budget | Packet Error Loss Rate (NOTE 2) | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 65 | | 0.7 | 75 ms | $10^{-2}$ | Mission Critical user plane Push To Talk voice (e.g., MCPTT) |
| 66 | | 2 | 100 ms | $10^{-2}$ | Non-Mission-Critical user plane Push To Talk voice |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) |
| 9 | | 9 | | | TCP-based (e.g., www, e-mail, chat, ftp, p2p file sharing, progressive video, etc.) |
| 69 | | 0.5 | 60 ms | $10^{-6}$ | Mission Critical delay sensitive signaling (e.g., MC-PTT signaling) |
| 70 | | 5.5 | 200 ms | $10^{-6}$ | Mission Critical Data (e.g., example services are the same as QCI 6/8/9) |

The Logical Channel Prioritization is standardized, e.g., in 3GPP TS 36.321, current version v13.1.0, in subclause 5.4.3.1 incorporated herein by reference. The Logical Channel Prioritization (LCP) procedure is applied when a new transmission is performed.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE allows the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the disclosure the terms "D2D", "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (B S). D2D users communicate directly while remaining controlled under the BS, i.e., at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 section 7.1.2 incorporated herein by reference:

Establishment of a secure layer-2 link over PC5.
IP address/prefix assignment.
Layer-2 link maintenance over PC5.
Layer-2 link release over PC5.

FIG. 3 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signalling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.3.0, defines in subclause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCD for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation mode, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a sidelink buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection mode, where a UE on its own selects resources (time and frequency) from resource pool(s) to transmit direct data and direct control information (i.e., SA). At least one resource pool is defined, e.g., by the content of SIB18, namely by the field commTxPoolNormalCommon, these particular resource pool(s) being broadcast in the cell and then commonly available for all UEs in the cell still in RRC_Idle state. Effectively, the eNB may define up to four different instances of said pool, respectively four resource pools for the transmission of SA messages and direct data. However, in Rel-12 a UE shall always use the first resource pool defined in the list, even if it was configured with multiple resource pools. This restriction was removed for Rel-13, i.e., a UE can transmit on multiple of the configured resource pools within one SC period. How the UE selects the resource pools for transmission is further outlined below (further specified in TS36.321).

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission Procedure for D2D Communication

The D2D data transmission procedure according to Rel. 12/13 differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done, e.g., with the exchange of the D2D communication Interest Indication by the UE and the corresponding response, D2D Communication Response, where the corresponding exemplary ProseCommConfig information element would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;

Step 2: eNB grants UL resource (for UE to send sidelink BSR) via PDCCH, scrambled by C-RNTI;

Step 3: UE sends D2D/sidelink BSR indicating the buffer status via PUSCH;

Step 4: eNB grants D2D resource (for UE to send data) via PDCCH, scrambled by D2D-RNTI.

Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSe) destination ID. The content of the SA (SCI) is basically in accordance with the grant received in Step 4 above. The D2D grant and SA content (i.e., SCI content) are defined in the 3GPP technical standard 36.212, current version 13.1.0, subclause 5.4.3, incorporated herein by reference, defining in particular the SCI format 0 (see content of SCI format 0 above).

On the other hand, for Mode 2 resource allocation, above steps 1-4 are basically not necessary, and the UE autonomously selects radio resources for the SA and D2D data transmission from the transmission resource pool(s) configured and provided by the eNB.

FIG. 5 exemplarily illustrates the transmission of the Scheduling Assignment and the D2D data for two UEs, UE-1 and UE-2, where the resources for sending the scheduling assignments are periodic, and the resources used for the D2D data transmission are indicated by the corresponding Scheduling Assignment.

FIG. 6 illustrates one specific example of the D2D communication timing for Mode 2, autonomous scheduling, during one SA/data period, also known as SC period, Sidelink Control period. FIG. 7 illustrates the D2D communication timing for Mode 1, eNB-scheduled allocation during one SA/data period. In Rel. 13, 3GPP defined an SC period as being the time period consisting of transmission of a Scheduling Assignment and its corresponding data. As can be seen from FIG. 6, the UE transmits after an SA-offset time, a Scheduling Assignment using the transmission pool resources for scheduling assignments for Mode 2, SA_Mode2_Txpool. The 1st transmission of the SA is followed, e.g., by three retransmissions of the same SA message. Then, the UE starts the D2D data transmission, i.e., more in particular the T-RPT bitmap/pattern, at some configured offset (Mode2data_offset) after the first subframe of the SA resource pool (given by the SA_offset). One D2D data transmission of a MAC PDU (i.e., a transport block) consists of its 1st initial transmission and several retransmissions. For the illustration of FIG. 6 (and of FIG. 7) it is assumed that three retransmissions are performed (i.e., 2nd, 3rd, and 4th transmission of the same MAC PDU). The Mode2 T-RPT Bitmap (time resource pattern of transmission, T-RPT) basically defines the timing of the MAC PDU transmission (1st transmission) and its retransmissions ($2^{nd}$ $3^{rd}$ and $4^{th}$ transmission). The SA pattern basically defines the timing of the SA's initial transmission and its retransmissions ($2^{nd}$ $3^{rd}$ and $4^{th}$ transmission).

As currently specified in the standard, for one sidelink grant, e.g., either sent by the eNB or selected by the UE itself, the UE can transmit multiple transport blocks, MAC PDUs, (only one per subframe (TTI), i.e., one after the other), however to only one ProSe destination group. Also the retransmissions of one transport block must be finished before the first transmission of the next transport block starts, i.e., only one HARQ process is used per sidelink grant for the transmission of the multiple transport blocks. Furthermore, the UE can have and use several sidelink grants per SC period, but a different ProSe destination be selected for each of them. Thus, in one SC period the UE can transmit data to one ProSe destination only one time.

As apparent from FIG. 7, for the eNB-scheduled resource allocation mode (Mode 1), the D2D data transmission, i.e., more in particular the T-RPT pattern/bitmap, starts in the next UL subframe after the last SA transmission repetition in the SA resource pool. As explained already for FIG. 6, the Model T-RPT Bitmap (time resource pattern of transmission, T-RPT) basically defines the timing of the MAC PDU transmission (1st transmission) and its retransmissions (2nd, 3rd, and 4th transmission).

The sidelink data transmission procedure can be found in the 3GPP standard document TS 36.321 v13.1.0, section 5.14, incorporated herein by reference. Therein, the Mode-2 autonomous resource selection is described in detail, differentiating between being configured with a single radio resource pool or multiple radio resource pools.

What is discussed above is the current status of the 3GPP standard for the D2D communication. However, it should be noted that there has been ongoing discussions on how to further improve and enhance the D2D communication which will likely result in that some changes are introduced to the D2D communication in future releases. The present disclosure as will be described later shall be also applicable to those later releases.

For example, for 3GPP Rel. 14 which is currently under development, 3GPP may decide to change the transmission timing so as to no longer be based on SC periods as discussed above, but differently (e.g., based on subframes same/similar to Uu interface transmissions). Correspondingly, the above detailed examples on how transmissions over the sidelink (PC5) interface can be performed are merely exemplary and may apply to Rel. 13, but possibly not for later releases of the corresponding 3GPP standards.

ProSe Network Architecture and ProSe Entities

FIG. 8 illustrates a high-level exemplary architecture for a non-roaming case, including different ProSe applications in the respective UEs A and B, as well as a ProSe Application Server and ProSe function in the network. The example architecture of FIG. 8 is taken from TS 23.303 v.13.2.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling, etc., related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:
  Exchange of ProSe control information between ProSe-enabled UE and the ProSe Function over PC3 reference point.
  Procedures for open ProSe Direct Discovery of other ProSe-enabled UEs over PC5 reference point.
  Procedures for one-to-many ProSe Direct Communication over PC5 reference point.
  Procedures to act as a ProSe UE-to-Network Relay. The Remote UE communicates with the ProSe UE-to-Network Relay over PC5 reference point. The ProSe UE-to Network Relay uses layer-3 packet forwarding.
  Exchange of control information between ProSe UEs over PC5 reference point, e.g., for UE-to-Network Relay detection and ProSe Direct Discovery.
  Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.
  Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

LCP Procedure for D2D, Sidelink Logical Channels

The LCP procedure for D2D according to Rel. 13 will be different than the above-presented LCP procedure for "normal" LTE data. The following information is taken from TS 36.321, current version 13.1.0, subclause 5.14.1.3.1 describing the LCP procedure for ProSe; it is incorporated herewith in its entirety by reference.

The Logical Channel Prioritization procedure is applied when a new transmission is performed. Each sidelink logical channel has an associated priority which can be the PPPP (ProSe per packet priority, explained later). Multiple sidelink logical channels may have the same associated priority. The mapping between priority and LCID is left for UE implementation.

The MAC entity shall perform the following Logical Channel Prioritization procedure for each SCI transmitted in an SC period:

The MAC entity shall allocate resources to the sidelink logical channels in the following steps:
Step 0: Select a ProSe Destination, not previously selected for this SC period, having the sidelink logical channel with the highest priority, among the sidelink logical channels having data available for transmission;
Step 1: Among the sidelink logical channels belonging to the selected ProSe Destination and having data available for transmission, allocate resources to the sidelink logical channel with the highest priority;
Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.

The UE shall also follow the rules below during the scheduling procedures above:
The UE shall allocate resources to the sidelink logical channels according to the following rules
the UE should not segment an RLC SDU (or partially transmitted SDU) if the whole SDU (or partially transmitted SDU) fits into the remaining resources;
if the UE segments an RLC SDU from the sidelink logical channel, it shall maximize the size of the segment to fill the grant as much as possible;
the UE should maximize the transmission of data;
if the MAC entity is given a sidelink grant size that is equal to or larger than 10 bytes while having data available for transmission, the MAC entity shall not transmit only padding.

NOTE: The rules above imply that the order by which the sidelink logical channels are served is left for UE implementation.

Generally, for one MAC PDU, MAC shall consider only logical channels with the same Source Layer-2 ID—Destination Layer 2 ID pairs, i.e., for one MAC PDU, the MAC entity in the UE shall consider only logical channels of the same ProSe destination group, which basically means that the UE selects a ProSe destination during the LCP procedure. In Rel-13 it is allowed to have more than one Sidelink Grant within a SC period. For each sidelink grant the UE can as in Rel-12 only transmit data of one ProSe destination group. However, since the UE can be configured to have more than one valid sidelink grant within one SC period, a transmitting UE can transmit data to different ProSe destinations, i.e., each SL grant must transmit data to a different ProSe destination.

QoS Support for ProSe

In Rel-13 QoS is supported generally for ProSe one-to-many communication. For that reason the so-called ProSe Per-Packet Priority (PPPP) was introduced, e.g., in TS 23.303. ProSe Per-Packet Priority is a scalar value associated with a protocol data unit, e.g., IP packet that defines the priority handling to be applied for transmission of that protocol data unit, i.e., priority handling for transmissions on the PC5 interface. In other words, ProSe PPP is a mechanism used to allow prioritization of packets when using ProSe Direct Communication including for ProSe UE-to-UE and also for ProSe Relay.

When the ProSe upper layer (i.e., above the PC5 access stratum) passes a protocol data unit for transmission to the PC5 access stratum, the ProSe upper layer provides a ProSe Per-Packet Priority from a range of 8 possible values.

The ProSe Per-Packet Priority is independent of the Destination Layer-2 ID and applies to both one-to-one and one-to-many ProSe Direct Communication. The ProSe Per-Packet Priority is selected by the application layer, e.g., based on various criteria that are outside the scope of this specification (such as delay requirements of the service like Voice packet transmissions or control signaling like floor control related signaling).

The ProSe Per-Packet Priority is independent of the mode in which the UE accesses the medium, i.e., whether scheduled or autonomous resource allocation mode for ProSe communication is used. The ProSe access stratum uses the ProSe Per-Packet Priority associated with the protocol data unit as received from the upper layers to prioritize the transmission in respect with other intra-UE transmissions (i.e., protocol data units associated with different priorities awaiting transmission inside the same UE) and inter-UE transmissions (i.e., protocol data units associated with different priorities awaiting transmission inside different UEs).

Priority queues (both intra-UE and inter-UE) are expected to be served in strict priority order, i.e., UE or eNB serves all packets associated with ProSe Per-Packet Priority N before serving packets associated with priority N+1 (lower number meaning higher priority).

The priority handling on the PC5 interface itself will be specified in TS36.321, i.e., logical channel prioritization LCP procedure. For each sidelink logical channel there will be an associated priority, e.g., similar to logical channel priority in legacy LTE UL operation. The creation of sidelink logical channels will be left to UE implementation, similar to Rel-12. In addition to taking source/destination ID of packets into account when creating a logical channel, the UE will also take into account the priority of packets. Essentially protocol data units having the same PPPP value (and same source/destination ID) will be served by one sidelink logical channel with a certain associated logical channel priority, which is the same as PPPP.

As explained above, during logical channel prioritization procedure when the UE receives a SL grant, the UE selects the ProSe group having the sidelink logical channel with the highest PPPP among the sidelink logical channels having SL data, and then serves all sidelink logical channels belonging to the selected ProSe destination group in a decreasing priority order.

Vehicular Communication—V2X Services

A new study item has been set up in the 3GPP in Rel. 14 to consider the usefulness of new LTE features to the automotive industry—including Proximity Service (ProSe) and LTE-based broadcast services. ProSe functionality is thus considered as offering a good foundation for the V2X services. Cooperative services in vehicular scenarios are becoming essential for the future connected vehicle within the ITS (Intelligent Transportation Systems) research field. They are supposed to decrease road fatalities, improve the capacity of roads, diminish the carbon footprint of road transport and enhance the user experience during travels.

V2X communication is the passing of information from a vehicle to any entity that may affect the vehicle, and vice versa. This information exchange can be used to improve safety, mobility and environmental applications to include driver assistance vehicle safety, speed adaptation and warning, emergency response, travel information, navigation, traffic operations, commercial fleet planning and payment transactions.

LTE support for V2X services contains 3 types of different use cases which are the following:

V2V: covering LTE-based communication between vehicles.

V2P: covering LTE-based communication between a vehicle and a device carried by an individual (e.g., handheld terminal carried by a pedestrian, cyclist, driver or passenger).

V2I: covering LTE-based communication between a vehicle and a road side unit.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

With regard to V2V communication, E-UTRAN allows such (vehicle) UEs that are in proximity of each other to exchange V2V-related information using E-UTRA(N) when permission, authorization and proximity criteria are fulfilled. The proximity criteria can be configured by the MNO (Mobile Network Operator). However, UEs supporting V2V Service can exchange such information when served by or not served by E-UTRAN which supports V2X Service.

The device (vehicle UE) supporting V2V applications transmits application layer information (e.g., about its location, dynamics, and attributes as part of the V2V Service). The V2V payload must be flexible in order to accommodate different information contents, and the information can be transmitted periodically according to a configuration provided by the MNO.

V2V is predominantly broadcast-based; V2V includes the exchange of V2V-related application information between distinct devices directly and/or, due to the limited direct communication range of V2V, the exchange of V2V-related application information between distinct devices via infrastructure supporting V2X Service, e.g., RSU, application server, etc.

With regard to V2I communication, the device supporting V2I applications sends application layer information to the Road Side Unit, which in turn can send application layer information to a group of devices or a device supporting V2I applications.

V2N (Vehicle to Network, eNB/CN) is also introduced where one party is a UE and the other party is a serving entity, both supporting V2N applications and communicating with each other via LTE network.

With regard to V2P communication, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P Service can exchange such information even when not served by E-UTRAN which supports V2X Service.

The UE supporting V2P applications transmits application layer information. Such information can be broadcast by a vehicle with UE supporting V2X Service (e.g., warning to pedestrian), and/or by a pedestrian with UE supporting V2X Service (e.g., warning to vehicle).

V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X Service, e.g., RSU, application server, etc.

For this new study item V2X, 3GPP has provided particular terms and definition in TR 21.905, current version 13.0.0, which can be reused for this application.

Road Side Unit (RSU): An entity supporting V2I Service that can transmit to, and receive from a UE using V2I application. An RSU can be implemented in an eNB or a stationary UE.

V2I Service: A type of V2X Service, where one party is a UE and the other party is an RSU both using V2I application.

V2N Service: A type of V2X Service, where one party is a UE and the other party is a serving entity, both using V2N applications and communicating with each other via LTE network entities.

V2P Service: A type of V2X Service, where both parties of the communication are UEs using V2P application.

V2V Service: A type of V2X Service, where both parties of the communication are UEs using V2V application.

V2X Service: A type of communication service that involves a transmitting or receiving UE using V2V application via 3 GPP transport. Based on the other party involved in the communication, it can be further divided into V2V Service, V2I Service, V2P Service, and V2N Service.

Many ITS services have common communication requirements:

Periodic status exchange. ITS services typically need to know about the status of vehicle or roadside terminals. This implies the periodic exchange of data packets with information about location, speed, identifier, etc.

Asynchronous notifications. This kind of messages is used to inform about a specific service event. In contrast to the previous status messages, the reliable delivery of these messages to a single terminal or a group of them is usually a key requirement.

Examples of the usage of the first communication type can be found on traffic efficiency services such as remote vehicle monitoring, which gathers periodic status data from vehicles, or safety services such as cooperative collision avoidance, which requires kinematic information about surrounding vehicles to detect potential impacts. Asynchronous notifications are mainly found in safety services, such as slippery pavement or post-collision warning.

Different types of messages are and will be defined for the V2V communication. Two different types of messages have been already defined by ETSI for the Intelligent Transport Systems (ITS), see corresponding European Standards ETSI EN 302 637-2 v1.3.1 and ETSI EN 302 637-3 v 1.2.1:

Cooperative Awareness Messages (CAM), which are continuously triggered by vehicle dynamics to reflect the vehicle status.

Decentralized Environmental Notification Messages (DENM), which are triggered only when vehicle-related safety events occur.

As the V2V and ITS standardizations are rather at the beginning, it is to be expected that other messages might be defined in the future.

CAMs are continuously (periodically) broadcast by ITS-Stations (ITS-S) to exchange status information with other ITS-Ss, and thus have a larger impact on the traffic load than event-triggered (aperiodic) DENM messages. Essentially CAM messages are a kind of heartbeat messages periodically broadcasted by each vehicle to its neighbors to provide information of presence, position, temperature, and basic status. On the contrary, DENMs are event-triggered messages broadcasted to alert road users of a hazardous event. For this reason, traffic characteristics of CAM messages as defined by ETSI for ITS are considered more representative of V2V traffic.

Cooperative Awareness Messages (CAMs) are messages exchanged in the ITS network between ITS-Ss to create and maintain awareness of each other and to support cooperative performance of vehicles using the road network. Point to multipoint communication shall be used for transmitting CAMs, such that the CAMs are transmitted from the originating ITS-S to the receiving ITS-Ss located in the direct communication range of the originating ITS-S. CAM generation shall be triggered and managed by the Cooperative Awareness basic service, which defines the time interval between two consecutive CAM generations. At present, the upper and lower limits of the transmission interval are 100 ms (i.e., CAM generation rate of 10 Hz) and 1000 ms (i.e., CAM generation rate of 1 Hz). The underlying philosophy of ETSI ITS is to send CAMs when there is new information to share (e.g., new position, new acceleration or new heading values). Correspondingly, when the vehicles are moving slowly and on constant heading and speed, a high CAM generation rate brings no real benefit at the CAMs only display minimal differences. The transmission frequency of CAMs of one vehicle varies between 1 HZ to 10 Hz as a function of the vehicle dynamics (e.g., speed, acceleration, and heading). For instance, the slower the vehicle drives, the less number of CAMs are triggered and transmitted. Vehicle speed is the main impacting factor on CAM traffic generation, In the above, the periodic Cooperative Awareness messages have been described. However, it should be noted that although some of the above information has already been standardized, other information, such as the periodicities and the message sizes, are not standardized yet and are based on assumptions. Furthermore, the standardization might change in the future and thus might also change aspects of how the CAMs are generated and transmitted.

Consequently, the above detailed description of the CAMs should be understood as an example conceived for illustration purposes. The above-described CAM message will be used throughout this application in order to explain the underlying principles of the invention. What is important for the disclosure is that V2V communication will require a vehicular UE to transmit different data in a periodic way, and it is foreseeable that the periodicity may quickly change as a function of vehicle dynamics such as (relative) speed, angles, heading, and possibly other factors such as vehicle distance, etc. Consequently, a challenge is that a vehicular UE shall be able to transmit several periodic packets of different message sizes with different and varying periodicities.

In order to the vehicular UE to have radio resources on the sidelink to transmit the CAMs, Mode1 and/or Mode2 radio resource allocation are envisioned as explained above. For Mode 1 radio resource allocation, the eNB allocates resources for the SA message and data for each SA period. However, when there is a lot of traffic (e.g., high-frequency periodic traffic), the overhead on the Uu link from UE to the eNB could be big.

As apparent from the above, a lot of V2V traffic is periodical, such that the 3GPP has agreed that for sidelink V2V communication Mode 1 (i.e., eNB scheduled radio resource allocation), sidelink semi-persistent radio resource allocation will be supported by eNBs and UEs.

For the UE-autonomous resource allocation mode (Mode 2) it is obvious that the collision problem, i.e., when more than one Tx UE select the same RBs to deliver messages, will impact the QoS experienced by the users. For Rel-12/13, the data (PSSCH) collision problem for the UE-autonomous resource allocation mode was not discussed since QoS for PC5/sidelink was not a major requirement. However, for V2X services, it is inevitable to improve the QoS for the UE-autonomous resource allocation mode. 3GPP generally agreed to improve the QoS of UE-autonomous resource selection by sensing and "semi-persistent" transmission (may also be termed radio resource reservation).

More in detail, it was agreed to support a sensing mechanism together with semi-persistent transmissions as autonomous resource control/selection mechanism for the V2X sidelink. The UE would indicate within the PSSCH (SA/SCI) that it has data on a selected set of periodically occurring resources until a resource selection occurs. This resource reservation information (signaled within the SCI) can be used by other UEs which are intending to transmit a V2X message for the selection of a resource such that resources that are already reserved/booked by other UEs are not considered for radio resource selection. This resource reservation/booking procedure shall be applied only to traffic for which packets arrive with a certain periodicity, e.g., CAM messages.

The indication of reserved radio resources in the scheduling information as mentioned above can be monitored ("sensed") by other (vehicular) devices. In general, sensing is used when identifying a set of candidate resources for transmission. For this purpose, the sensing process categorizes frequency resources into different groups:

'Unavailable' resources. These are the resources on which the UE is not allowed to transmit since those resources are already booked/reserved by other UEs.

'candidate resources'. These are the resources on which the UE may/can perform a transmission, and might be further categorized into 'primary resources' and 'secondary resources'

Sensing should be implementable in a simple way in order not to increase the complexity of the UE too much. It should be also noted that there might be multiple ways/options on how to implement the sensing algorithm. One potential implementation option is that every UE has a map with a prediction of frequency resources that spans over at most, e.g., 1 second, starting from the next subframe. That is, at time P when a packet arrives at the buffer in the UE, the UE has a map of all frequency resources for subframes P to L, L basically denoting the maximum time span (according to QoS) until the packet should be transmitted, whether each of the resources is 'Unavailable', or candidate.

The 'Unavailable' resources are determined based on the SCI decoding (resource booking/reservation). It should be noted that the details of the selection of the actual resource for transmission (from the set of resource candidates) have not been finally decided yet in 3GPP and are still subject to discussion. One exemplary approach would be that the selection of the actual resources used for transmission is performed at random within the set of candidate resources, assigning an equal probability to all choices. Randomness might be suitable in order to ensure that UEs with similar maps of resources select different resources. As long as the set of candidate resources is large enough, using a random selection ensures that the probability that UEs with correlated observations choose the same resource(s) is low. As a basis, the UE considers the nearest resources categorized as a candidate resources for (re)transmission of a transport block. Further restrictions may be applied to ensure that the candidate resources meet other relevant requirements such as latency, bandwidth, etc. All these resources constitute the set of candidate resources for transmission.

Another approach would be to use also further energy-based sensing results in order to select the actual transmission resources among the candidate resources (in contrast to random selection). Energy-based sensing is referred to a process where UE measures Rx signal strength on PSSCH resources and/or PSCCH resources. Energy-based sensing primarily helps a UE to rank the resources within the candidate list of radio resources. Energy-based sensing essentially helps to identify near versus far interferers. More in particular, radio resources with relatively low energy detected should be can be selected, whereas resources with relatively high energy are not selected.

It should be noted that by having a map with information at RB level, the UE has full flexibility and does not need to know the size of the transport block to schedule when sensing.

However, although general agreements were reached as regards sensing and resource reservation for V2X transmissions over the PC5 interface, no further changes are foreseen at present to the current standard(s) to account for these new sensing and resource reservation mechanisms. Correspondingly, implementing these mechanisms into current systems might cause problems and inefficiencies.

BRIEF SUMMARY

Non-limiting and exemplary embodiments provide an improved transmitting device and method for transmitting periodic data. The independent claims provide non-limiting and exemplary embodiments. Advantageous embodiments are subject to the dependent claims.

Correspondingly, according to a first aspect, a transmitting device is provided for transmitting periodic and aperiodic data to one or more receiving devices via a sidelink interface (e.g., the PC5 interface). A kind of semi-persistent resource allocation shall be implemented for the periodic transmissions according to which radio resources are reserved in advance, e.g., by transmitting additional indication(s) in the scheduling information transmitted for a previous periodic data transmission. The semi-persistent allocation shall be implemented at least for the UE-autonomous radio resource allocation, where the transmitting device autonomously selects radio resources for the transmission of the periodic/aperiodic data via the sidelink interface (e.g., from configured radio resource pools).

In more detail, the transmitting device transmits a first periodic message together with the corresponding scheduling information, which indicates the radio resources for the current transmission of the first periodic message, but which also additionally indicates a radio resource reservation for later point in time. These reserved radio resources can then be used for transmitting a further periodic message. Correspondingly, even when the next periodic message arrives early (i.e., before the time for which the radio resources are reserved), the transmitting device delays this periodic message until the later point in time so as to be able to use the reserved radio resources to transmit the periodic message.

On the other hand, the transmitting device may handle other data than the above-mentioned periodic messages differently (may be other periodic data but also aperiodic data), i.e., by not applying a semi-persistent radio resource allocation and the delaying of the data. Instead, the transmitting device may transmit the other data without the delay, i.e., at the earliest possible point in time upon becoming available for transmission. Correspondingly, the transmitting device may immediately trigger the selection of suitable radio resources and then proceed to transmit the other data using the selected radio resources (again assuming UE-autonomous radio resource allocation).

Correspondingly, the scheduling behavior for the transmitting device is different depending on the data that is to be transmitted. As explained above, the transmitting device may selectively determine specific periodic data for which a semi-persistent resource allocation is then applied, comprising the reservation of radio resources in advance as well as the delaying of data that arrives before the reserved radio resources are actually available for the transmission. On the other hand, for other data no semi-persistent resource allocation is applied and thus the other data may be scheduled dynamically such that it is transmitted as early as possible (depending on the availability of radio resources at that time).

Furthermore, the reserved radio resources may in one variant exclusively be used for transmitting the periodic data for which these radio resources were reserved.

More generally, the semi persistent resource allocation according to the above aspect can also be specific to a particular sidelink logical channel or to a set of particular sidelink logical channels and all data belonging to said sidelink logical channel(s), i.e., is logical channel specific. Therefore, the transmitting device determines whether data that becomes available for transmission at a particular time is data for which radio resources have been reserved in advance, i.e., whether the data belongs to the same sidelink logical channel(s) as that data which scheduling information transmitted before reserved some radio resources. In said case, the transmitting device will proceed to delay—if necessary—the data until there reserved radio resources are available. Otherwise, the data is transmitted at the earliest possible point of time, e.g., by autonomously selecting other resources and using same for the immediate transmission of the data.

Correspondingly, in one general first aspect, the techniques disclosed here feature a transmitting device for transmitting periodic data via a sidelink interface to one or more receiving devices. The transmitting device autonomously selects radio resources for transmitting periodic and aperiodic data via the sidelink interface. A transmitter of the transmitting device transmits first periodic data together with first scheduling information to the one or more receiving devices. The first scheduling information indicates radio resources used for transmitting the first periodic data and further indicates reserved radio resources usable at a later point in time by the transmitting device to transmit second periodic data. A processor of the transmitting device delays the second periodic data until the later point in time. The transmitter transmits the second periodic data at the later point in time using the reserved radio resources indicated by the first scheduling information. On the other hand, the transmitter transmits other data than the first and second periodic data at the earliest possible point in time upon becoming available for transmission.

Correspondingly, in one general first aspect, the techniques disclosed here feature a method for transmitting periodic data via a sidelink interface from a transmitting device to one or more receiving devices. The transmitting device autonomously selects radio resources for transmitting periodic and aperiodic data via the sidelink interface. The method comprises the following steps performed by the transmitting device. First periodic data is transmitted together with first scheduling information to the one or more receiving devices. The first scheduling information indicates radio resources used for transmitting the first periodic data and further indicates reserved radio resources usable at a later point in time by the transmitting device to transmit second periodic data. The second periodic data is delayed until the later point in time and then transmitted at the later point in time using the reserved radio resources indicated by the first scheduling information. Other data than the first and second periodic data is transmitted at the earliest possible point in time upon becoming available for transmission.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIG. 9 illustrates periodic transmissions of scheduling information and periodic data at various time instances according to an exemplary embodiment, FIG. 10 illustrates transmissions of scheduling information and periodic data as well as aperiodic data at various time instances according to an exemplary embodiment.

DETAILED DESCRIPTION

Figure 1:
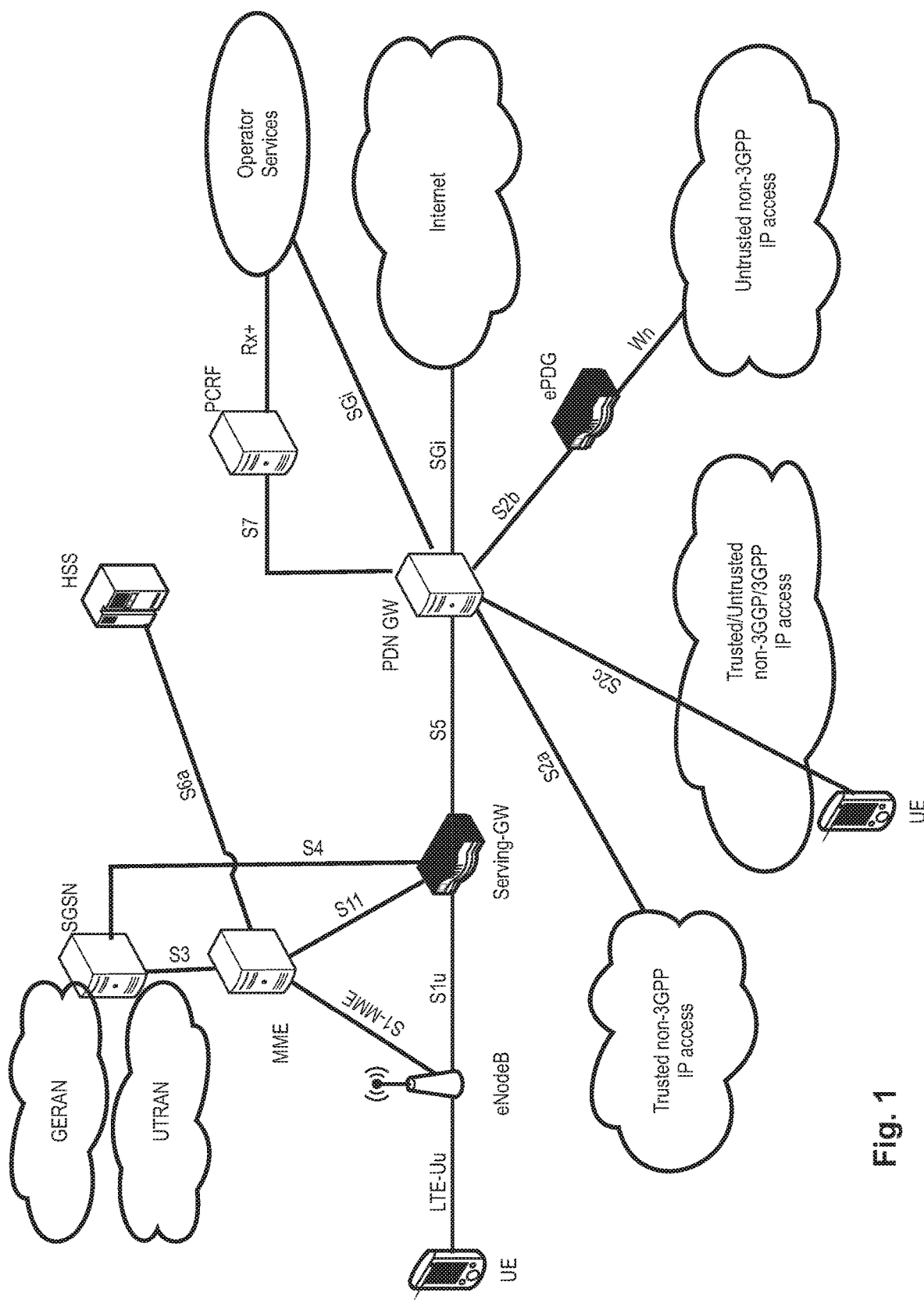
FIG. 1 shows an exemplary architecture of a 3GPP LTE system.
Figure 2:
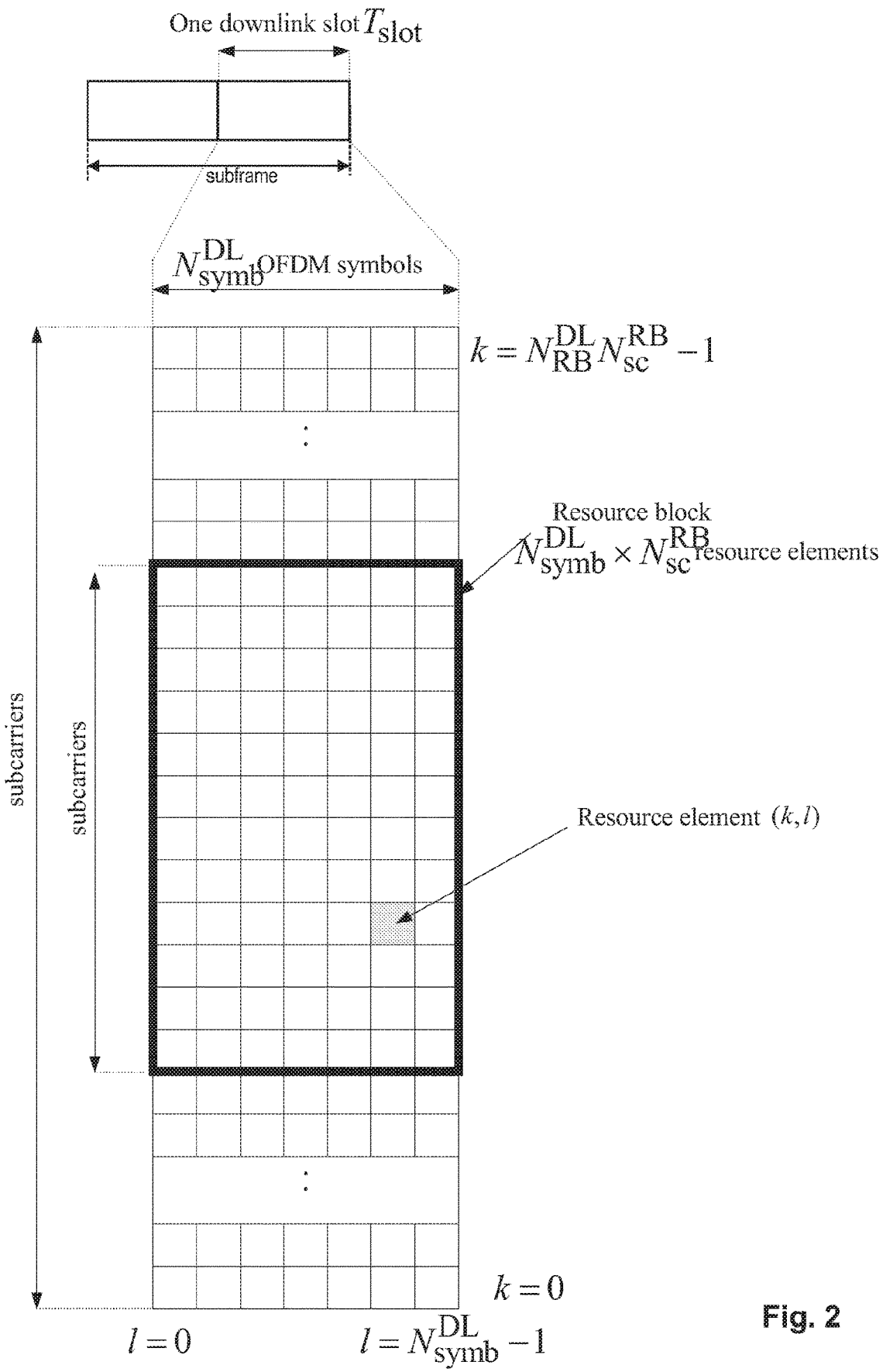
FIG. 2 shows an exemplary downlink resource grid of a downlink slot of a subframe as defined for 3GPP LTE (Release 8/9), FIG. 3 schematically illustrates how to establish a layer-2 link over the PC5 for ProSe communication.
Figure 3:
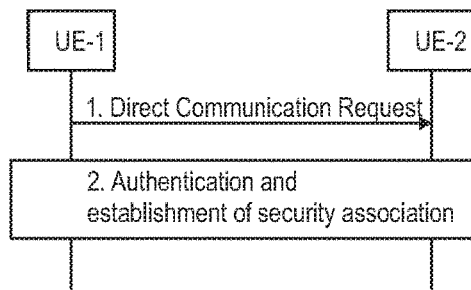
Figure 4:
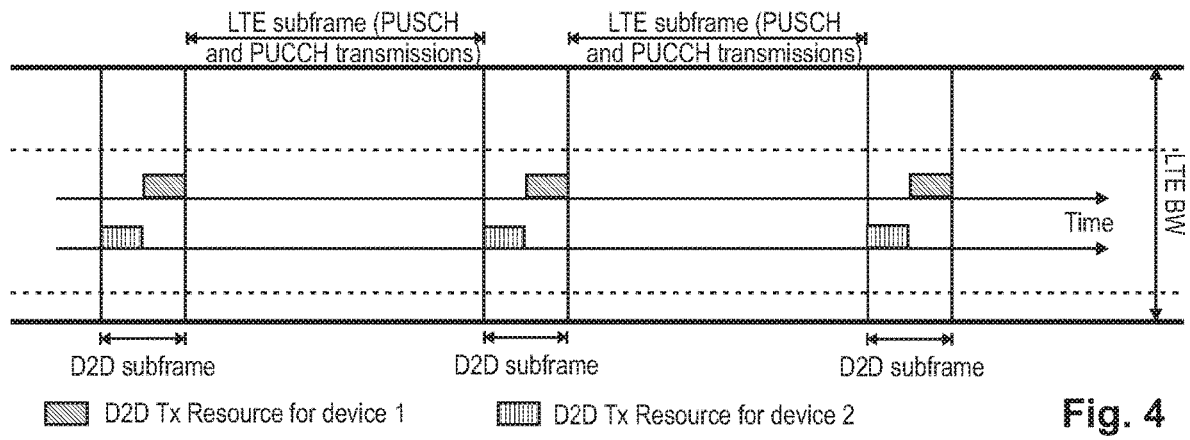
FIG. 4 illustrates the use of transmission/reception resources for overlay (LTE) and underlay (D2D) systems.
Figure 5:
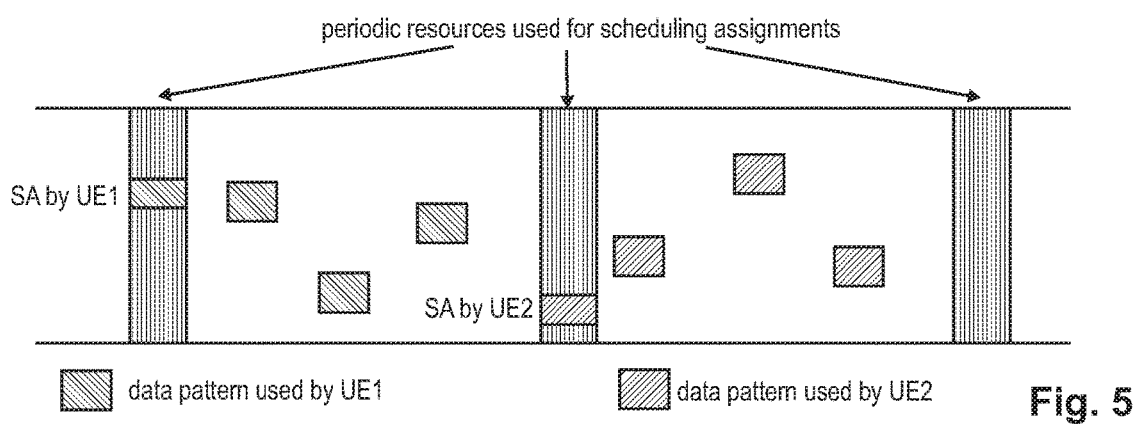
FIG. 5 illustrates the transmission of the Scheduling Assignment and the D2D data for two UEs.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "direct communication transmission" as used in the application is to be broadly understood as a transmission directly between two user equipments, i.e., not via the radio base station (e.g., eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection", "sidelink interface" is to be broadly understood and can be understood in the 3GPP context as the PC5 interface described in the background section.

The term "ProSe" or in its unabbreviated form, "Proximity Services", used in the application is applied in the context of Proximity-based applications and services in the LTE system as exemplarily explained in the background section. Other terminology such as "D2D" is also used in this context to refer to the Device-to-Device communication for the Proximity Services.

The term "vehicular mobile terminal" as used throughout the application is to be understood in the context of the new 3GPP study item respectively work item V2X (vehicular communication) as explained in the background section. Correspondingly, a vehicular mobile terminal shall be broadly understood as a mobile terminal which is specifically installed in a vehicle (e.g., car, commercial trucks, motorcycles, etc.) to perform vehicular communication, i.e., passing information related to the vehicle to other entities (such as vehicles, infrastructure, pedestrians), e.g., for the purpose of safety or driver assistance. Optionally, the vehicular mobile terminal may have access to information available at the navigation system (provided it is also installed in the car), such as map information, etc.

As explained in the background section, 3GPP has introduced a new study item for LTE-assisted vehicular communication, which shall be based on ProSe procedures to exchange V2X traffic between the various vehicular mobile terminals and other stations. Furthermore, a kind of semi-persistent radio resource allocation shall be supported for V2X traffic and it has been agreed that mechanisms for radio resource reservation as well as sensing will be supported to said end—in particular for the UE-autonomous resource allocation mode (also referred to as Mode 2). However, only general agreements have been reached with respect to sensing and radio resource reservation without providing details on how to implement same and how to adapt other mechanisms so as to ensure efficient and flawless operation.

For instance, sensing and radio resource reservation will strongly influence how the (vehicular) UE will select the radio resources and will transmit data over the PC5 interface. In Mode 2 the vehicular UE autonomously selects radio resources from suitable resource pools. It is unclear how a semi-persistent allocation can be implemented, especially when the UEs are supposed to do sensing and resource booking/reservation.

The following exemplary embodiments are conceived by the inventors to mitigate the problem(s) explained above.

Particular implementations of the various embodiments are to be implemented in the wide specification as given by the 3GPP standards and explained partly in the background section, with the particular key features being added as explained in the following embodiments. It should be noted that the embodiments may be advantageously used for example in a mobile communication system, such as 3GPP LTE-A (Release 10/11/12/13/14) communication systems as described in the Technical Background section above (or later releases), but the embodiments are not limited to its use in these particular exemplary communication networks.

The explanations should not be understood as limiting the scope of the disclosure, but as mere examples of embodiments to better understand the present disclosure. A skilled person should be aware that the general principles of the present disclosure as laid out in the claims can be applied to different scenarios and in ways that are not explicitly described herein. Several assumptions are made for illustration purposes which however shall not restrict the scope of the following embodiments.

The various embodiments mainly provide an improved transmission of periodic and aperiodic data from a transmitting device to one or more receiving devices via a sidelink interface. This also involves the allocation of radio resources, for instance controlled autonomously by the transmitting device. Other functionality (i.e., functionality not changed by the various embodiments) may remain exactly the same as explained in the background section or may be changed without any consequences to the various embodiments. This may include for instance other procedures such as how the transmission of the periodic data is exactly performed by the transmitting device, or how the various transmitting devices discover each other.

One exemplary scenario to which the various embodiments can be applied is V2X-communication as exemplified in the background section. Consequently, the transmitting and receiving devices can be, e.g., a UE in a vehicle, a road side unit, a "normal" mobile terminal carried by a pedestrian, etc. Further, the periodic data may be vehicular data, e.g., CAM messages, which shall be continuously exchanged among the various vehicular entities.

Although the following exemplary embodiments will be explained for illustration purposes in connection with such a V2X-communication scenario, the disclosure shall not be restricted thereto. Rather, the disclosure may also be applied more generally to other (non-vehicular) scenarios where for example "normal" UEs are transmitting periodic and aperiodic data via the Uu interface to the eNB or via the PC5 interface (sidelink connection) to other UE(s).

First Embodiment

In the following a first embodiment for solving the above-mentioned problem(s) will be described in detail. Different implementations and variants of the first embodiment will be explained as well.

As already mentioned above, exemplarily, a vehicular UE is assumed which is installed in a vehicle and is capable of performing vehicular communication based on the D2D framework as explained in the background section of this application. Correspondingly, vehicular data (e.g., periodic and aperiodic data) shall be transmitted by the vehicular UE to other entities for which the data is of interest.

The periodic data to be transmitted by the vehicular UE will be exemplified by the Cooperative Awareness Messages (CAMs) explained in detail in the background section. The characteristics of the CAMs that are relevant to the disclosure are that CAMs are transmitted in a periodic fashion and are thus in general suitable for a semi-persistent resource allocation. However, CAMs are significantly different from the usual VoIP usage scenario of semi-persistent scheduling scenarios in that there are different and even varying transmission periodicities and/or different message sizes (i.e., the amount of data that is to be transmitted and for which the vehicular UE needs radio resources). VoIP exhibits a fixed periodicity and fixed message size that may be handled by the well-known semi-persistent radio resource allocation performed by the eNodeB.

It should be noted that CAMs are merely an example of such periodic data, and that the disclosure may be applied to other data types as well that are or will be standardized in the future for vehicular or non-vehicular communication. Especially for the vehicular communication it is likely that a vehicular UE may have to periodically broadcast (status and attribute) data at different and/or even varying periodicities, and thus may have to transmit at different time instances messages with more or less data and with different periodicities. A semi-persistent radio resource allocation to be implemented for the V2X communication over the PC5 interface must take this into account.

Aperiodic data is exemplified in the following with the DENM messages introduced in the background section, since DENM messages are triggered by vehicle-related safety events and thus are not as such periodic. On the other hand, after being triggered, the DENM messages may be repeatedly transmitted for a particular amount of time, so as to make sure that receiving devices will receive same, thus constituting periodic data during that brief period of time. Nevertheless, in the following exemplary embodiment and its variants, periodic data is assumed to be CAM messages, and DENM messages are considered to be aperiodic data.

As explained in the background section, sensing and radio resource reservation have been generally approved by 3GPP to be included in future standard release(s). In particular, radio resource reservation at the transmitting side allows implementing a kind of "semi-persistent" radio resource allocation, by, e.g., reserving the same resources as currently used also for one or more later time instances so as to use same to transmit further packets of the periodic data. Consequently, it is not necessary at those later time instances for the vehicular UE to again perform a resource selection/request (Mode-1 or Mode-2 resource allocation) in order to be able to transmit the periodic data. In the following, it will be mostly assumed that the resource reservation is only performed for the next time instance of the periodicity (see, e.g., FIG. 9) although the (first) embodiment is equally applicable to scenarios where radio resource reservations for a longer time period (i.e., for more than one time instance) are possible.

The radio resource reservation can be implemented in different ways and has not been fixed yet by 3GPP. The scheduling information (SCI) transmitted together with sidelink data identifies the radio resources that are used for the transmission and thus allows a receiving entity to properly receive and process/decode the sidelink data. The scheduling information may additionally be used to indicate the radio resource reservation, e.g., by indicating a time or periodicity of the data such that the receiving entity can determine for which time (e.g., subframe) the radio resources are reserved. In one example, the scheduling information might comprise a corresponding field for indicating the later time instance(s) for which the resources (indicated in said scheduling information) are also reserved. The value of the field can be determined from the periodicity of the data (or more generally the logical channel) for which the radio reservation shall apply. For instance, a periodicity of CAM messages of 100 ms will mean that a corresponding periodicity field of the scheduling information will indicate this 100 ms.

Optionally, in said field (or a separate field) the scheduling information might further indicate for how many time instances of the periodicity the resource reservation shall apply; provided such an explicit indication is even necessary, since this might also be determined by the UEs in another way, e.g., predetermined or configured by, e.g., the RRC protocol, etc.

It is likely that the radio resources already indicated in the scheduling information (i.e., as used for the current transmission) will be reserved for the later time instance; this would have the advantage of supporting the sensing operation and making the resource reservation mechanism more efficient by reducing the collision probability. However, this is not strictly necessary. For instance, other radio resources may be reserved, e.g., by additionally indicating the other radio resources in the scheduling information or by, implicitly determining same from the radio resources that are already identified for being presently used for the transmission of the periodic data (e.g., by using a predetermined rule to derive the reserved radio resources).

At first, it is assumed that the UE supports and mainly performs Mode-2 radio resource allocation and has been properly configured with the necessary resource pool(s) to be able to autonomously select radio resources for transmitting the scheduling information as well as the data via the PC5 (sidelink) interface.

Figure 6:
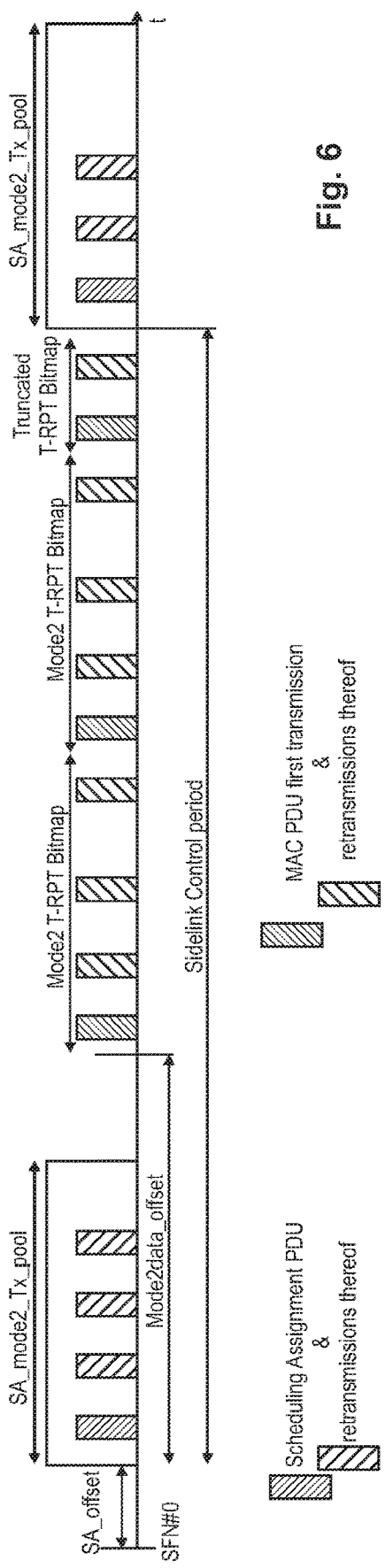
FIG. 6 illustrates the D2D communication timing for the UE-autonomous scheduling Mode 2.
Figure 7:
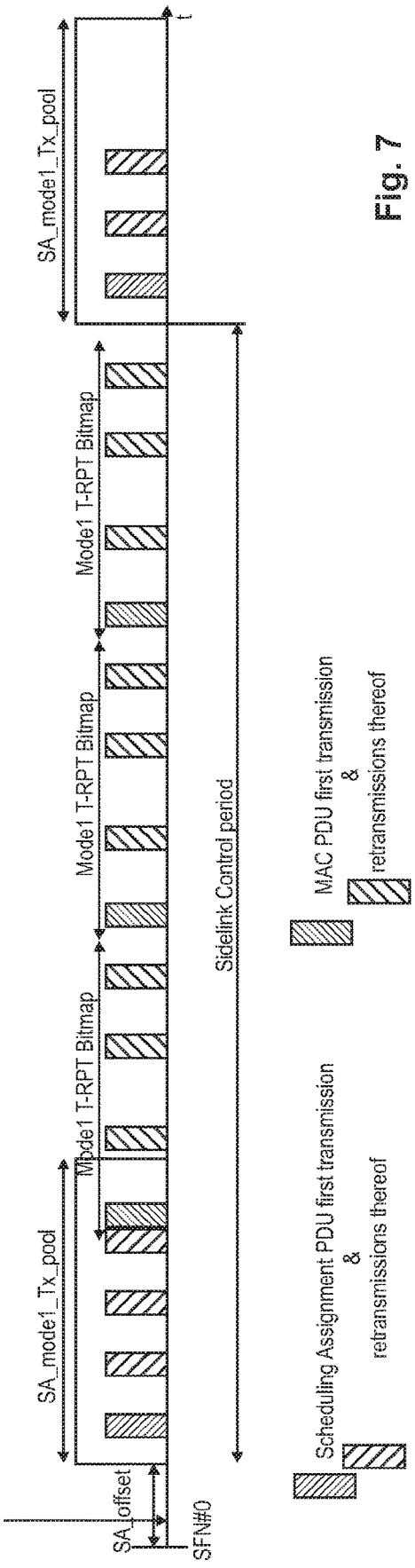
FIG. 7 illustrates the D2D communication timing for the eNB-scheduled scheduling Mode 1.
Figure 8:
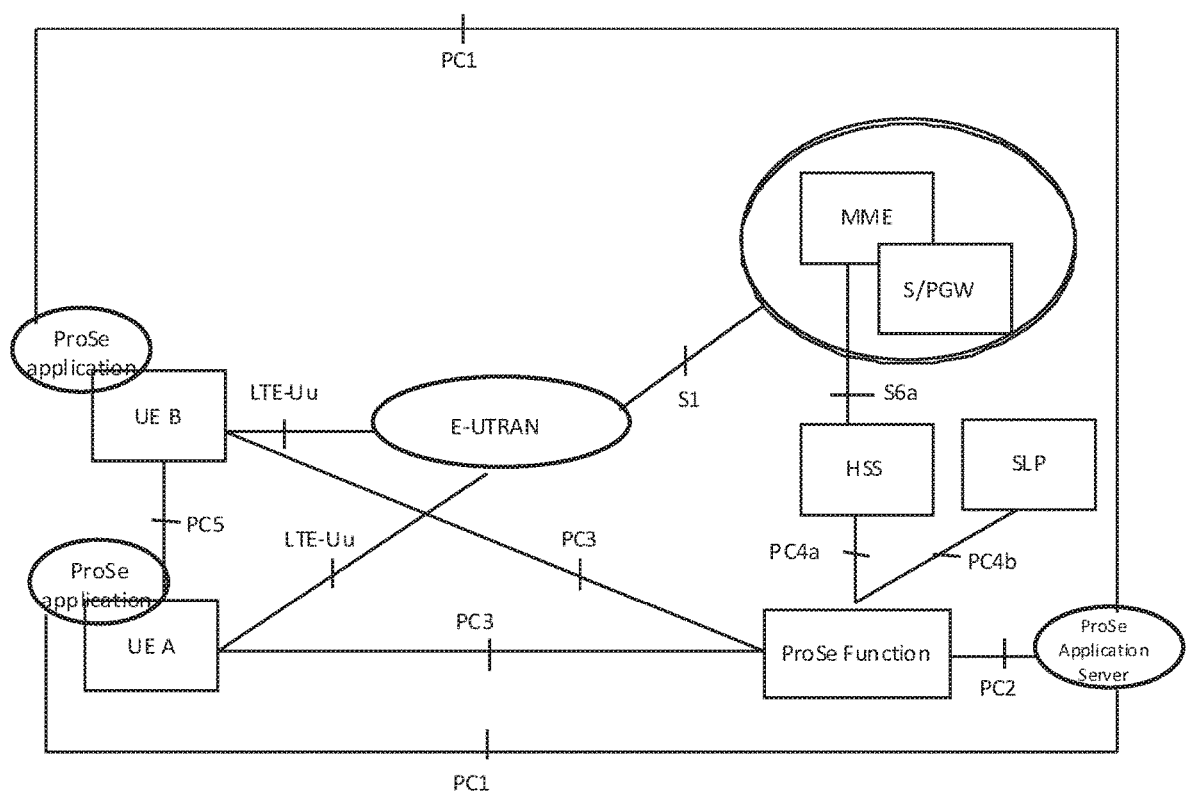
FIG. 8 illustrates an exemplary architecture model for ProSe for a non-roaming scenario.

In order to effectively transmit the periodic CAM messages, a new UE behavior is provided, which will be explained exemplarily in connection with FIG. 9, which illustrates a periodic transmission of data at time instances t1-t4. In order to facilitate illustration and explanation of the embodiment, several assumptions are made. For instance, it is exemplarily assumed that the scheduling information and data are transmitted in the same subframe, although it is equally possible that the scheduling information is transmitted in one of the subframes before the actual transmission of the data. As currently discussed in 3GPP meetings, the transmission timing in future releases for D2D transmission via the PC5 interface (as of Rel. 14) might be changed compared to the timing as used in previous Rel. 12/13 and shown in FIGS. 6 and 7. Consequently, it might be decided to transmit the SCI and the D2D data in the same subframe, as exemplarily assumed for FIG. 9.

It is also assumed that the UE is immediately able to transmit data that is becoming available for transmission, instead of having to wait for radio resources to be free to use.

At time t0, a vehicular application starts generating periodic data (e.g., the CAM messages) for the first time and correspondingly forwards the CAM messages to the lower layers for transmittal via the PC5 interface. It is assumed that the application layer will transmit a priority indication (such as the ProSe-per-Packet Priority, PPPP) together with the periodic data to the lower layers. The lower layers in turn will configure a corresponding sidelink logical channel for the periodic data, e.g., depending on the PPPP (priority indication) of the periodic data. In accordance with the configured Mode-2 UE-autonomous resource allocation, the vehicular UE will start selecting radio resources from a suitable resource pool to transmit the CAM message. The amount of resources selected by the UE will depend on the size of the CAM message.

At this point, it should be noted that the vehicular application layer, generating CAM messages in a periodic fashion, will not generate the data in perfect periodicity. Rather, there can be some variation in the generation of the periodic data, such that the CAM messages are actually generated around particular time instances given by the periodicity of the CAM messages. The variation in the generation of the periodic data can be caused by a jitter originated in the transmitting device, e.g., caused by the timing clocks of the (V2X) application and the operating system. Furthermore there can be a timing offset for the generation of the CAM message. Specifically, for the CAMs with a given periodicity, when some speed change/heading change occurs suddenly due to some driving events (acceleration, emergency brake, emergency turning, etc.) with corresponding trigger condition being met, one or two CAM messages may be generated with an interval not following the original CAM periodicity. Then, after recovery from these sudden and occasional events, the CAM periodicity may return to the same periodicity as before, but the timing offset for the series of subsequent CAMs would be changed compared with original CAM traffic pattern (i.e., the CAMs before the sudden speed or heading change).

Correspondingly, the resource selection by the UE may already consider this jitter/offset in the message generation by selecting the radio resources (then to be continuously used in a semi-persistent fashion) with an offset compared to the arrival of the periodic data. The amount of offset can be chosen so as to ensure that future CAM message generation actually occurs before the time of the reserved radio resources, in order to avoid that CAM messages become available for transmission (shortly) after the time for which the radio resource had been reserved. Using the selected radio resources, the vehicular UE then transmits the first CAM message at time t1. The vehicular UE knows from the upper layer that the CAM messages have a certain (current) periodicity (e.g., 100 ms), e.g., by receiving a specific indication with the periodicity, or from being encoded in the PPPP. The UE can thus expect to have to transmit a further CAM message at future time instances (e.g., the next one at about t0+100 ms). Consequently, the vehicular UE further reserves corresponding resources at time t2, which can be, e.g., simply t1+100 ms, i.e., the time at which the next CAM message is expected but also taking into account the generation jitter and the offset initially applied to the resource selection.

Indeed, before time t2, data of the CAM message becomes available for transmission (e.g., several subframes before time t2). However, since the vehicular UE knows about the radio resources reserved for the periodic CAM messages, it will not perform radio resource selection but rather will delay the periodic data until time t2 for which radio resources had been reserved by the transmission at time t1. After delaying the transmission of the CAM message, the vehicular UE uses the reserved radio resources for transmitting the new CAM message at time t2. Consequently, this semi-persistent resource allocation avoids the need to additionally select radio resources UE, and the radio resources that have already been reserved can be efficiently used. A further advantage of this process is that no other radio resources are suddenly used to transmit the CAM message even if it becomes available for transmission too early, such that the reserved radio resources are not wasted. Furthermore, the other (vehicular) devices, continuously performing sensing to identify reserved radio resources, correctly avoid the reserved radio resources when performing a radio resources selection.

Again, at time t2 the vehicular UE will reserve radio resources for a further CAM message transmission at time t3 (e.g., t3=t2+100 ms) by appropriately indicating same in the scheduling information transmitted at time t2 together with the CAM message. As expected, a new CAM message is generated by the vehicular application and arrives in the buffer(s) of the lower layer before the time t3. The CAM message is then delayed until time t3, at which the reserved radio resources are available for being used for the transmission of that CAM message. The transmission of the CAM message is performed at time t3. The same process of radio resource reservation and delaying of the periodic data is then continuously performed.

It should be noted that the delaying of the CAM message(s) as just explained in connection with FIG. 9 may be restricted to only the periodic CAM messages, such that other data (be it periodic or aperiodic data) is transmitted without delay, i.e., at the earliest possible point of time upon becoming available for transmission. In particular, it is exemplarily assumed that the vehicular application of the vehicular UE also generates aperiodic data, such as DENM messages, that are to be transmitted. Correspondingly, again assuming Mode-2 resource allocation for the transmission via the PC5 interface, the lower layers of the UE receive a DENM message from the application layer, and the UE proceeds to transmit the DENM message, which involves the selection of radio resources as well as the subsequent actual transmission of the DENM message, together with the corresponding scheduling information if necessary. A simple illustration is given in FIG. 10 where at the time t5 periodic data is becoming available for transmission and is immediately transmitted (provided radio resources for the transmission are immediately available). Also, no radio resource reservation is performed by the vehicular UE through the scheduling information transmitted together with the aperiodic data in this exemplary case, since the data is aperiodic and thus a future transmission cannot be predicted.

Alternatively, when considering the repetitions of the DENM message during a specific time period after the first DENM is triggered, radio resource reservation and optionally delaying of the DENM message repetition(s) may also be applied—at least temporarily—to the transmission of the DENM repetitions.

Overall, different types of scheduling behaviors for the vehicular UE are foreseen. Specific periodic data, such as the CAM messages, shall be transmitted using semi-persistently reserved radio resources (i.e., using radio resource reservation as discussed above to indicate future CAM message transmissions) and shall be delayed as appropriate so as to be able to use the reserved radio resources to transmit the periodic data. On the other hand, for other data, such as aperiodic data (e.g., DENM messages) or other periodic data, the radio resource selection process can be triggered immediately (may also be referred to as dynamic scheduling), such that the corresponding data is transmitted as soon as possible, i.e., without any delay.

The above presented embodiment focuses on the transmission of periodic data, for which the resource reservation is performed and for which data is delayed until the time of the reserved radio resources. As briefly touched above, at the time of an initial transmission of a particular type of periodic data (e.g., the CAM messages mentioned above), the vehicular UE creates on its own (i.e., without the base station) a corresponding sidelink logical channel, specific to the priority and/or periodicity of the periodic data. The radio resource reservation, rather than being dependent on the specific data as such (i.e., CAM messages), can be made dependent on the sidelink logical channel, such that the radio resource reservation is exclusively usable for the transmission of all types of data (with the same/similar priority and/or periodicity) belonging to the same sidelink logical channel. In brief, data of a particular sidelink logical channel handling the CAM messages and other similar periodic data (i.e., other than the CAM messages) can be transmitted using the reserved radio resources (and may have to be delayed in said respect), while other data (be it periodic or aperiodic data) from other sidelink logical channels should not be able to use the reserved radio resources; this other data has to be then transmitted separately, e.g., by appropriately selecting or requesting radio resources and transmitting same using said selected/requested radio resources. As such, the radio resource reservation as well as the delaying of the periodic data for which the radio resources have been reserved are logical channel dependent.

One exemplary implementation of the above-discussed embodiments changes how the sidelink logical channel prioritization procedure is applied for allocating the reserved radio resources for generating a transport block to be transmitted. As explained in the background section, the sidelink logical channel prioritization procedure usually considers all logical channels that have data pending for transmission. On the other hand, in order to ensure that the reserved radio resources are to be exclusively used for transmission of the periodic data (e.g., the CAM messages), the sidelink LCP procedure, performed at the particular time for which the radio resources are reserved, can be performed to only consider that sidelink logical channel for which the radio resources had been reserved in advance; all other logical channels are excluded at that time instance from the LCP procedure. Thereby, it is avoided that higher-priority data prevents the periodic data (the CAM messages) to be transmitted. As a disadvantage, in case that not all of the reserved radio resources are needed to transmit the periodic data at that time instance, unused reserved radio resources are wasted since they cannot be used to transmit other data than the data belonging to that sidelink logical channel.

Consequently, in an alternative, the sidelink LCP procedure may be adapted so as to consider the data of that logical channel for which the radio resources are reserved as having the highest priority, thereby achieving that the reserved radio resources are first allocated to transmitting the data of that particular logical channel while at the same time leaving the flexibility to also transmit other data in case reserved radio resources remain.

A further exemplary implementation of the above-discussed embodiments changes how the sidelink logical channel prioritization procedure is applied for allocating radio resources for generating a transport block to be transmitted. For radio resources which are not explicitly reserved by a scheduling control information, i.e., also referred to as dynamically selected respectively allocated, the transmitting UE shall only consider those logical channels which are not supposed to use reserved radio resources. By not considering sidelink logical channels which are using reserved radio resources it is ensured that the data of those "semi-persistent" sidelink logical channels is delayed until the reserved resources and not being transmitted at an earlier point of time.

Further variants of the above-described embodiment provide advantageous implementation details as will become apparent from below. As apparent from the above discussed FIGS. 9 and 10, scheduling information is transmitted together with each of the data transmissions, even though after the transmittal of the first CAM message the radio resources for subsequent CAM message transmission are reserved in advance and should—at the time of transmission—already be known to the receiving devices. Nevertheless, by transmitting scheduling information at each time instance, it is not only possible to continue the radio resource reservation for the next time instance (e.g., at time t2 reserving for time t3), but the additional transmission of the scheduling information makes sure that also other receiving devices that did not receive the previous scheduling information (i.e., at time t2) will be able to properly receive the periodic data at time t3.

Figure 11:
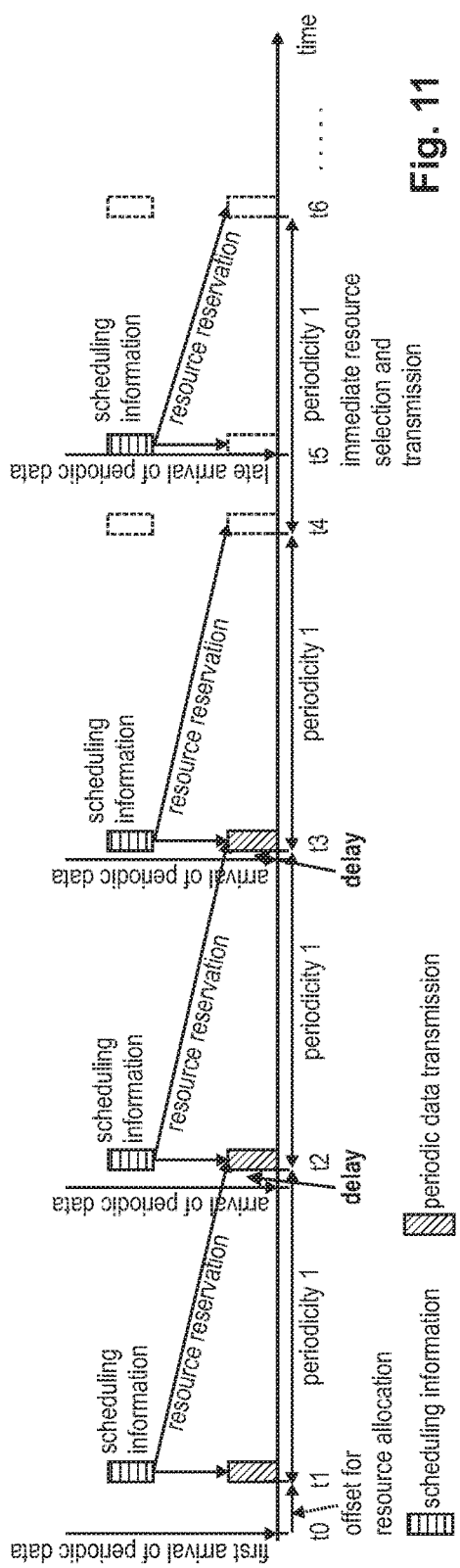
FIG. 11 illustrates transmissions of scheduling information and periodic data at various time instances according to an exemplary embodiment.

Furthermore, in FIG. 10 an "early" arrival of the periodic data is assumed for each time instance which is then "compensated" by a delay of the transmission until the time the reserved radio resources are available. By appropriately setting the offset to account for the timing offset/jitter, a late arrival of periodic data (i.e., after the time for which the radio resources are reserved) should be avoided. Despite the offset or because the offset is not set appropriately or not set at all or due to some other reasons (such as a change of speed), the periodic data may in other cases arrive later than expected, i.e., after the time for which the radio resources have been reserved. This is illustrated in FIG. 11, showing the periodic radio resource reservation at time t4 and the late arrival of the periodic data at time t5. Due to the late arrival of the periodic data, the reserved radio resources at the time t4 cannot be used. Further, the vehicular UE will not be able to delay the data but will transmit the late periodic data at the earliest possible point in time upon becoming available for transmission (exemplarily assumed to be immediately at time t5). This dynamic transmission of the periodic data involves a suitable selection (Mode 2) of radio resources and the subsequent transmission of the periodic data using said selected radio resources. The radio resources reserved for time t4 are wasted and will likely not be used by other entities, which had identified same as being reserved for time t4. In order to meet delay requirements, the late periodic data shall be transmitted as soon as possible rather than delaying same.

In addition, the late dynamic transmission of the periodic data at time t5 may in turn again be used to suitably reserve radio resources for a later point in time (t6), since further periodic data transmissions can be expected. There are several options on how to determine at which time t6 further radio resources should be reserved. For instance, the radio resource reservation could be continued with basically the same periodicity as before, i.e., the same distance between t3 and t4 and between t4 and t6 in which case the time indication within the scheduling information should be accordingly calculated (t6=t4+periodicity 1) (shown in FIG. 11). Alternatively, in view of that the previous radio resource reservation was not perfectly timed and thus resulted in a missed opportunity of using the reserved radio resources, the new radio resource reservation may slightly be adapted to account for this missed timing. Consequently, the radio resources could be reserved, e.g., for time t6=t5+periodicity 1 (not shown in FIG. 11).

Figure 12:
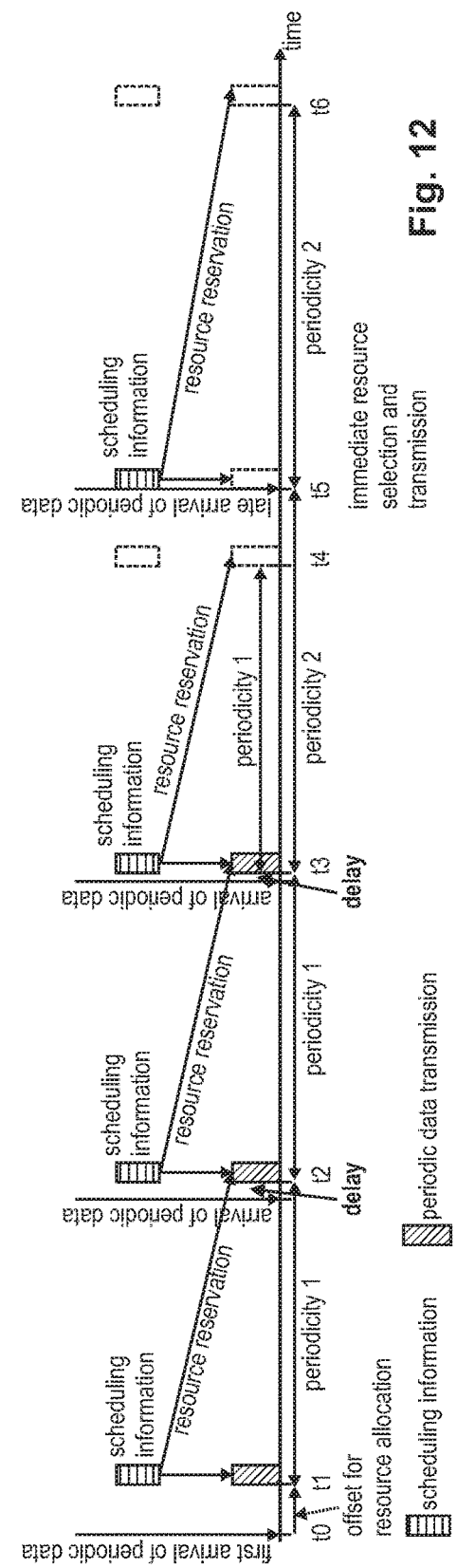
FIG. 12 illustrates transmissions of scheduling information and periodic data at various time instances according to an exemplary embodiment.

According to a further variant of the embodiment, the UE may assume that the late or early arrival of the periodic data indicates a change in the periodicity of the data. As exemplary illustrated in FIG. 12, the changed periodicity 2 was responsible for the late arrival of the periodic data, and the vehicular UE assumes the changed periodicity for future transmissions of the periodic data and accordingly reserves radio resources at a time t6=t5+periodicity 2. This can be similarly applied to an exceedingly early arrival of the periodic data. Optionally, although not illustrated in FIG. 12, an offset could be additionally considered, similar to the resource allocation at time to. The variant of the embodiment could also be made dependent on the difference between the expected arrival of the periodic data and when the actual periodic data actually arrived. For instance, if the difference is only small, the vehicular UE may assume that this is within a "normal" variability of the generation of the periodic data in the upper layers (i.e., the jitter). On the other hand, if the difference is greater than a particular limit, the vehicular UE may assume that the periodicity of the periodic data has changed (e.g., due to a speed change of the vehicle).

According to another variant of the above embodiment(s), a maximum time for which the periodic data may be delayed can be defined. Such a maximum time may be, e.g., indicated by the upper layer together with the periodic data (similar to the PPPP), for instance separately or together with the priority indication (PPPP); optionally, the maximum time may be indicated only once, e.g., when generating the periodic data for the first time and forwarding same to the lower layers. Alternatively, the maximum delay time may be determined from particular delay requirements given by the specific periodic data, or may otherwise be determined in the vehicular UE. In any case, the vehicular UE will determine to delay periodic data only if the delay is lower than (or equal to) the above-mentioned maximum delay time. In the converse case that the delay would be too large (e.g., equal to or larger than the maximum delay time), the vehicular UE would decide to not delay the periodic data but to immediately proceed to transmit same. Correspondingly, the vehicular UE would select other radio resources to perform the transmission as soon as possible.

According to yet another variant of the embodiment, the lower layer starts upon arrival of a packet from application, e.g., arrival in the PDCP buffer, a timer with the value set to the corresponding maximum delay time value provided by application layer together with the packet. When the timer expires, the transmitting device will discard the corresponding packet since the maximum allowed time for delivery is exceeded.

For instance, in the above discussed FIGS. 9 and 10, where the periodic data arrived shortly before the time for which the radio resources had been reserved, it may be assumed that the delay incurred by the above discussed embodiment(s) would be smaller than the maximum delay time. On the other hand, in case the periodic data arrives at a much earlier point in time, the delay that would be incurred could be too large, and the vehicular UE may thus decide to immediately transmit the early periodic data instead of waiting for the reserved radio resources.

Equally, when assuming a radio resource reservation for more than one time instance, a late arrival of data (e.g., shortly after the time for which the radio resources have been reserved, see FIG. 11) may likely lead to an immediate transmission of the late periodic data, since the reserved radio resources for the next time instance would lead to an increased delay and are anyway to be used for the next transmission of the periodic data.

Moreover, exceeding the maximum delay time may be used as an indication that the periodicity of the periodic data has changed, and may thus trigger the vehicular UE to assume a new, changed, periodicity based on which the radio resource reservation is performed for future data transmissions. Alternatively, in order to guarantee robustness, the maximum delay time has to be exceeded a particular number of times, before the vehicular UE assumes a change of periodicity, and until then it continues to reserve radio resources based on the "old" periodicity.

In the above, it is assumed without going into detail that radio resource reservation is used by the vehicular UE to transmit the CAM messages. Whether and for which periodic data the vehicular UE shall perform the above-described embodiment can be controlled according to one of the following examples. In general, (vehicular) UEs receive CAM message from upper application layers, e.g., together with a ProSe per packet priority (PPPP) which defines the priority handling to be applied for the transmission of that CAM message over the PC5 interface (see also background section for further details about PPPP). When receiving such data for the first time, the access stratum of the UE configures a corresponding sidelink logical channel for the CAM messages with the associated PPPP, as explained above. Later data received together with the same PPPP (and for the same source/destination pair respectively application), will be handled by said same sidelink logical channel.

Furthermore, the access stratum of the vehicular UE will also learn about the periodicity of the CAM messages from the upper layers. For example, the periodicity information may in one example be encoded into the PPPP, e.g., by providing additional values, such that the UE will learn the periodicity of the data directly from the priority indication. Alternatively, a separate periodicity indication can be provided from the upper layers together with the data. In any case, the lower layers of the UE will be able to determine the periodicity of the data received from the upper layers. Instead of providing an explicit indication, the lower layers of the vehicular UE, e.g., MAC layer or PDCP layer, could also learn the periodicity of the data based on the packet arrival in the L2 buffer, e.g., PDCP buffer. However, the UE would only learn over time the periodicity of the data based on the packet arrival. For example the estimated periodicity is linearly extrapolated based on the time of arrival to the PDCP layer/L2 layer for the previous N—an integer number—packets for the considered sidelink logical channel. On the other hand, in case the application layer informs the Access Stratum—Lower layers of the UE—about the periodicity, the vehicular UE has this information instantaneously—does not need to wait until it has received some packets—and can hence use this information for the radio reservation procedure.

Furthermore, whether or not the vehicular UE shall apply a semi-persistent resource allocation as explained above for the periodic data, may be, e.g., left to the UE implementation or may be controlled by the base station, e.g., using system information or RRC signaling in general, or controlled by the ProSe function or application layer.

In any case, the vehicular UE determines whether or not to apply resource reservation for the transmission of periodic data of a particular sidelink logical channel.

A vehicular UE may have more than one periodic sidelink logical channel. For instance, apart from the above discussed CAM messages, a vehicular UE may also support, e.g., e-Calls which are similar to voice over IP (VoIP) in that a periodic transmission of (voice) data occurs. More types of periodic data may be supported in the future. Correspondingly, the vehicular UE could apply the radio resource reservation mechanism to each of these periodic sidelink logical channels. On the other hand, this could have the disadvantage that too many radio resources are reserved by each vehicle UE.

According to a variant of the above-described embodiments, a maximum number of parallel radio resource reservations can be foreseen so as to avoid that too many radio resources are reserved by a single vehicular UE. Correspondingly, a vehicular UE may be configured to only allow a particular number of simultaneous "SPS" sidelink logical channels. Thus, for the remaining periodic sidelink logical channels the usual dynamic scheduling is performed such that the vehicular UE selects/requests radio resources and performs the transmission as soon as possible after the data becomes available for transmission, i.e., without reserving resources and delaying the data.

The maximum number of simultaneous logical channels can either be fixed in a 3GPP standard or preconfigured in the device, or may be flexibly configured by the base station, e.g., by using system information or RRC messages. Alternatively, the ProSe function or the application layer could configure the maximum number of reservations a vehicular device is allowed to use simultaneously.

Moreover, according to a further variant of the embodiment, the radio resource reservation exclusively reserves radio resources for particular periodic data, e.g., of a particular sidelink logical channel. In particular, as explained above for the embodiment, the vehicular UE transmits periodic data of a sidelink logical channel in a first transmission, at the same time reserving the (same or other) resources for a later point in time. In one variant, the reserved radio resources may only be used to transmit data of that particular sidelink logical channel for which the SCI of the previous transmission reserved the radio resources. However, by exclusively reserving these radio resources, the radio resources may not always be used, exemplary in cases where the data of that sidelink logical channel is received too late and thus cannot use the reserved radio resources. Therefore, in another variant, while the reserved radio resources shall preferably be used to transmit data of the specific logical channel (e.g., CAM messages), the UE is allowed to use the reserved radio resources to transmit other data, in case the periodic data is not available for transmission on time.

Even though in the embodiments above the radio resources are only reserved for data of one logical channel, it may be also possible—since logical channel multiplexing is supported in the LCP procedure for ProSe—that a vehicular UE transmits data of more than one sidelink logical channel in one transport block and thus also reserves radio resources for those sidelink logical channels for future usage. In general, the reserved radio resources may only be used to transmit data of the particular one or more sidelink logical channel(s) for which the SCI of the previous transmission reserved the radio resources. Furthermore, the vehicular UE shall only reserve radio resource for data of several logical channels in case the periodicity of those logical channels is the same.

According to further variants of the above embodiment, the UE behavior shall also take into account periodicity changes of the periodic data (e.g., CAM messages) that may occur during operation. As mentioned before, the generation of the periodic data in the upper layers is not perfectly periodic and may vary to a small degree, in which case the periodicity as such does not change. On the other hand, the periodicity may change significantly, e.g., due to a change in the vehicle dynamics such as speed, angle or direction. According to one variant, the upper application layer that generates the periodic data may inform the lower layers when the periodicity with which the periodic data is generated changes. For instance, this may be implemented using a corresponding periodicity indication forwarded by the upper layers together with the periodic data, the periodicity indication simply including a different value when the periodicity changes. The lower layer(s) of the vehicular UE that receive the periodicity indication thus learn about the changed periodicity. Alternatively, the change of periodicity may also be inferred by the lower layer from the changed arrival timing of the data (as explained before, e.g., in connection with FIG. 12).

Upon being aware of the periodicity change, one variant of the embodiment shall provide for an immediate transmission of the periodic data even for the case that radio resources are already reserved, since the reserved radio resources do no longer comply with the changed periodicity of the periodic data. Correspondingly, the vehicular UE will, after the data becomes available for transmission, immediately start with the radio resource selection and will transmit the periodic data using the selected radio resources as soon as possible (depending on the available radio resources). This first transmission of the periodic data after a periodicity is changed may in turn lead to a radio resource reservation for one or more future transmissions, considering the changed periodicity and correspondingly indicating same in the scheduling information. The radio resource reservation can thus adapt to changing periodicities.

Also the content, and thus the size, of the CAM messages may change, in which case the reserved radio resources might not be enough to transmit the complete CAM message. When a change in size occurs together with a change of periodicity, the vehicular UE may perform a dynamic resource allocation and thus has the opportunity to first select the sufficient amount of resources and a suitable periodicity. On the other hand, if the CAM message size increases without a change of periodicity, the vehicular UE shall equally ignore the resource reservation and proceed to dynamically allocated resources and transmit the CAM message according to the selected resources. At the same time, by including a suitable indication in the scheduling information, the newly allocated radio resources are reserved equally at one or more future time instances, thereby ensuring that future radio resources are sufficient to transmit the larger CAM message too.

According to a further variant, it is possible to revoke a radio resource reservation previously made. For instance, in cases as discussed above where the UE already knows that a future radio resource reservation will not be used, it is possible to broadcast a revocation of the previously made radio resource reservation. This could be for example done by sending SCI (scheduling control information) pointing to the radio resource which should be revoke with a special field set to "revoke". This special field could be an additional bit/flag or alternatively a specific predefined combination of fields contained within the SCI could be used to indicate the "revoking" of previously reserved radio resources.

In the above exemplary explanation of the embodiments it was assumed that the reserved resources are available at future time instances—i.e., that no other UE has reserved such resources. However, the UE might have to select new radio resources with a slightly different periodicity at the time instance when the reservation is no longer valid anymore, also referred to as reselection e. Therefore, it might happen that—in case there are no available resources due to reservation by other UEs—the periodicity is not constant but rather may slightly change over a longer time period.

In the above embodiment, it has been assumed that the vehicular UE mainly uses the Mode-2 resource allocation. On the other hand, a vehicular UE may also support the Mode 1 resource allocation so as to request resources from its eNodeB. In order to implement a semi-persistent resource allocation for the ProSe data transmissions via the PC5 interface for Mode 1, a similar approach can be used as currently foreseen for semi-persistent allocations via the Uu interface. Consequently, when the vehicular UE requests resources for transmitting periodic data via the PC5 interface, the eNodeB may decide to use a semi-persistent resource allocation. A corresponding semi-persistent grant can be provided to the vehicular UE, periodically assigning radio resources usable to transmit the periodic data via the PC5 interface. Optionally, the semi-persistent grant can already take into account the jitter/offset of the CAM message generation.

According to further embodiments, the triggering of a scheduling request (and thus of the subsequent buffer status report) is prevented for certain logical channels. In particular, even when periodic data of the certain logical channel becomes available at a point in time for which no semi-persistent radio resources are available, the vehicular UE shall not trigger a scheduling request nor the transmission of the corresponding buffer status report to dynamically request radio resources from the eNodeB. Instead, the periodic data becoming available for transmission is delayed to a later time instance where semi-persistent resources are again available, i.e., the vehicular UE shall not request a new dynamic grant but rather uses the semi-persistently allocated resource for the transmission of the periodic data.

Since for the V2X message transmissions over the PC5 interface, one-to-all ProSe Direct Communication is adopted and "One-to-all ProSe Direct Communication is connectionless, the eNB scheduler will be assisted by the UE in setting up/configuring the SPS configuration/allocation. More in particular, the vehicular UE may provide assistance information for the SPS configuration to the eNB by indicating the required periodicity and offset. The eNodeB in turn will determine and allocate semi-persistent radio resources to the vehicle UE, suitable for the changed periodicity. Also, in order to take into account the different and changing periodicities of vehicular periodic data (e.g., the CAM messages), e.g., due to a change in the vehicle dynamics, the vehicular UE may inform the eNodeB about a periodicity change.

According to a further variant of the embodiment, a new UE behavior respectively rule is introduced which should prevent the UE from triggering SR/BSR for certain logical channels. More in particular, a BSR triggered due to data arrival of a logical channel for which UE provided UE assistance information to the eNB for the SPS configuration shall not trigger a SR.

Alternatively, the vehicular UE shall not trigger an SR caused by the triggering of a BSR due to data arrival for data of a sidelink logical channel which was transmitted on a semi-persistent allocated resource, e.g., radio resources allocated by a DCI scrambled with SPS RNTI, Hardware and Software Implementation of the Present Disclosure Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transmitting device for transmitting periodic data via a sidelink interface to one or more receiving devices, wherein the transmitting device autonomously selects radio resources for transmitting periodic and aperiodic data via the sidelink interface, wherein the transmitting device comprises:
    a transmitter, which in operation, transmits first periodic data together with first scheduling information to the one or more receiving devices, the first scheduling information indicating radio resources used for transmitting the first periodic data and further indicating reserved radio resources usable at a later point in time by the transmitting device to transmit second periodic data; and
    a processor, which in operation, delays the second periodic data until the later point in time, and wherein the transmitter, when in operation, transmits the second periodic data at the later point in time using the reserved radio resources indicated by the first scheduling information; and
    wherein the transmitter, when in operation, transmits other data than the first and second periodic data in response to the other data becoming available for transmission, and
    wherein the first scheduling information includes a field indicating the later point in time for which the radio resources are reserved, wherein the processor, when in operation, determines the later point in time for the reserved radio resources based on a periodicity of the first and second periodic data.

2. The transmitting device according to claim 1, wherein the processor, when in operation, determines whether data becoming available for transmission is the second periodic data for which the radio resources are reserved, by determining that the data belongs to the same logical channel as the first periodic data.

3. The transmitting device according to claim 1, wherein the processor, when in operation, determines whether data becoming available for transmission is the first periodic data based on whether the data belongs to a specific logical channel, and in the affirmative case, the processor, when in operation, determines to reserve the radio resources for the later point in time.

4. The transmitting device according to claim 2, wherein in case the data belongs to the same logical channel as the first periodic data, the processor, when in operation, further determines whether radio resources have been reserved, and in the affirmative case, determines to delay the second periodic data until the later point in time for which the radio resources are reserved, and wherein in case the data does not belong to the same logical channel as the first periodic data, the processor, when in operation, determines to transmit said data at an earliest point in time, including autonomously selecting other radio resources to be used for the transmission of the data.

5. The transmitting device according to claim 3, wherein the specific logical channel is configured based on a priority indication and/or a periodicity indication for the first periodic data provided by an upper layer in the transmitting device, and wherein the periodicity of the periodic data is indicated by the upper layer in the transmitting device together or separately from the priority indication.

6. The transmitting device according to claim 1, wherein a maximum delay time is configured, wherein the processor is configured to determine a number of times the first periodic data is delayed more than the maximum delay time, and in response to the determined number of times being greater than a predetermined number, further periodic data, becoming available for transmission after the determination, is transmitted at an earliest point in time upon becoming available for transmission.

7. The transmitting device according to claim 6, wherein the transmission of the second periodic data at the earliest possible point in time includes the processor, in operation, autonomously selecting other radio resources to be used for the transmission of the second periodic data, and wherein scheduling information transmitted together with the second periodic data indicates the selected radio resources used for transmitting the second periodic data and further indicates reserved radio resources usable at the later point in time by the transmitting device to transmit third periodic data, and wherein the maximum delay time is indicated from an upper layer together with or separately from a priority indication of periodic vehicular data.

8. The transmitting device according to claim 1, wherein in case an indication is received for the second periodic data indicating that the periodicity for the second periodic data is changed, the second periodic data is transmitted at an earliest point in time.

9. The transmitting device according to claim 1, wherein a maximum number of simultaneous radio resource reservations is configured for the transmitting device to limit a number of radio resource reservations the transmitting device makes simultaneously.

10. The transmitting device according to claim 1, wherein the reserved radio resources are the same or are different from the radio resources used for transmitting the first periodic data, and wherein in case that the reserved radio resources are the same as the radio resources used for transmitting the first periodic data, one field of the first scheduling information indicates both the reserved radio resources and the radio resources used for transmitting the first periodic data, and wherein the reserved radio resources are defined by at least frequency-time resources and a modulation and coding scheme to be used for the transmission.

11. The transmitting device according to claim 1, wherein the reserved radio resources are reserved for the second periodic data, such that the reserved radio resources are to be used exclusively for transmitting the second periodic data.

12. The transmitting device according to claim 1, wherein the other data is aperiodic data or other periodic data and is transmitted by the transmitting device by the processor autonomously selecting other radio resources and the transmitter transmitting the other data using the selected other radio resources.

13. The transmitting device according to claim 1, wherein the periodic data comprises Cooperative Awareness Messages, CAM, triggered periodically to provide updated vehicular status information, and the aperiodic data comprises Decentralized Environmental Notification Messages, DENM, triggered by vehicle-related safety events.

14. The transmitting device according to claim 1, wherein the transmitter, when in operation, transmits second scheduling information together with the second periodic data indicating the reserved radio resources used for transmitting the second periodic data.

15. The transmitting device according to claim 1, wherein radio resources are scheduled semi-persistently by a base station to transmit fourth periodic data, wherein in case the periodic data becomes available for transmission before the semi-persistently scheduled radio resources, the transmitting device does not trigger and does not transmit a scheduling request for requesting further radio resources from the base station to transmit the periodic data.

16. The transmitting device according to claim 15, wherein the periodic data is delayed until the semi-persistently scheduled radio resources such that the transmitter transmits the periodic data using the semi-persistently scheduled radio resources.

17. The transmitting device according to claim 1, wherein the transmitting device is a vehicular mobile terminal, a road side unit, or a mobile terminal, and the periodic data is periodic vehicular data or periodic non-vehicular data.

18. The transmitting device according to claim 1, wherein the transmitting device, when in operation, performs sensing of the reserved radio resources by:
monitoring for scheduling information transmitted by another device indicating radio resources reserved by the another device for another later point in time, and excluding the radio resources reserved by the another device from a plurality of radio resources when reserving the radio resources from the plurality of radio resources at the later point in time.

19. The transmitting device according to claim 1, wherein a maximum delay time is configured, and the processor, when in operation:
determines whether the second periodic data is to be delayed by more than the maximum delay time, and
in response to determining that the second periodic data is to delayed by more than the maximum delay time, transmits the second periodic data at an earlier time than the maximum delay time.

20. A method for transmitting periodic data via a sidelink interface from a transmitting device to one or more receiving devices, wherein the transmitting device autonomously selects radio resources for transmitting periodic and aperiodic data via the sidelink interface, the method comprising the following steps performed by the transmitting device:
transmitting first periodic data together with first scheduling information to the one or more receiving devices, the first scheduling information indicating radio resources used for transmitting the first periodic data and further indicating reserved radio resources usable at a later point in time by the transmitting device to transmit second periodic data, wherein the first scheduling information includes a field indicating the later point in time for which the radio resources are reserved;
determining the later point in time for the reserved radio resources based on a periodicity of the first and second periodic data;
delaying the second periodic data until the later point in time and transmitting the second periodic data at the later point in time using the reserved radio resources indicated by the first scheduling information; and
transmitting other data than the first and second periodic data in response to the other data becoming available for transmission.

* * * * *